US011911703B2

(12) United States Patent
Kanaya

(10) Patent No.: US 11,911,703 B2
(45) Date of Patent: Feb. 27, 2024

(54) PROGRAM, INFORMATION PROCESSING METHOD, INFORMATION PROCESSING DEVICE, AND SERVER

(71) Applicant: GREE, INC., Tokyo (JP)

(72) Inventor: Yosuke Kanaya, Tokyo (JP)

(73) Assignee: GREE, INC., Tokyo (JP)

( * ) Notice: Subject to any disclaimer, the term of this patent is extended or adjusted under 35 U.S.C. 154(b) by 61 days.

(21) Appl. No.: 17/531,354

(22) Filed: Nov. 19, 2021

(65) Prior Publication Data
US 2022/0152515 A1 May 19, 2022

(30) Foreign Application Priority Data

Nov. 19, 2020 (JP) ................................ 2020-192179

(51) Int. Cl.
A63F 13/00 (2014.01)
A63F 13/847 (2014.01)
A63F 13/335 (2014.01)
A63F 13/69 (2014.01)

(52) U.S. Cl.
CPC .......... *A63F 13/847* (2014.09); *A63F 13/335* (2014.09); *A63F 13/69* (2014.09)

(58) Field of Classification Search
CPC ........ A63F 13/86; A63F 13/35; A63F 13/355; A63F 13/87
See application file for complete search history.

(56) References Cited

U.S. PATENT DOCUMENTS

2003/0038805 A1* 2/2003 Wong ...................... A63F 13/30
                                                                    345/473
2017/0003784 A1* 1/2017 Garg ........................ A63F 13/87
2017/0006074 A1* 1/2017 Oates, III ........... H04N 21/2353

FOREIGN PATENT DOCUMENTS

JP       H08-215433 A     8/1996
JP         6492212 B1     3/2019
JP       2020-62429 A     4/2020

OTHER PUBLICATIONS

Jan. 4, 2023 Office Action issued in Japanese Patent Application No. 2020-192179.

* cited by examiner

*Primary Examiner* — David L Lewis
*Assistant Examiner* — Eric M Thomas
(74) *Attorney, Agent, or Firm* — Oliff PLC

(57) ABSTRACT

A computer is configured to receive an input operation from a distribution user and connect to game circuitry that manages progress of a game, and to video distribution circuitry. The computer sends, to the video distribution circuitry, display control data for displaying, on a viewing user device, a video of the game. The computer receives, from the game circuitry, gift data that is based on a gift output request sent from the viewing user device. The computer displays a gift that is based on the gift data. An image corresponding to consecutive behaviors of the game is displayed on the screen of the game, when a specified command included in game operation data sent from a user device used by any of the users participating in the game and the gift output request sent from the viewing user device cause the consecutive behaviors to be established.

19 Claims, 15 Drawing Sheets

| 410 | GROUP ID (411) | USER ID (412) |
|---|---|---|
| | GROUP A | USER A1 |
| | | USER A2 |
| | | USER A3 |
| | | USER A4 |
| | | ⋮ |
| | GROUP B | USER B1 |
| | | USER B2 |
| | | USER B3 |
| | | USER B4 |
| | | ⋮ |

FIG. 2

| 420 | GAME ID (421) | GROUP ID (422) | USER ID (423) |
|---|---|---|---|
| | 010 | GROUP A | USER A1 |
| | | | USER A5 |
| | | | USER A11 |
| | | GROUP B | USER B3 |
| | | | USER B7 |
| | | | USER B4 |
| | 011 | GROUP C | USER C2 |
| | | | USER C13 |
| | | | USER C20 |
| | | GROUP D | USER D3 |
| | | | USER D5 |
| | | | USER D6 |

FIG. 3

PROGRAM, INFORMATION PROCESSING METHOD, INFORMATION PROCESSING DEVICE, AND SERVER

This application claims the benefit of priority from Japanese Patent Application No. 2020-192179 filed Nov. 19, 2020, the entire contents of the prior application being incorporated herein by reference.

TECHNICAL FIELD

This disclosure relates to a program, an information processing method, an information processing device, and a server.

BACKGROUND TECHNOLOGY

In recent years, watching game play videos (game live videos) has become popular. A game live video allows a viewer who has never played a game to enjoy the content of the game being played by a highly skilled user. Therefore, a system has been proposed that distributes a game live video (see, for example, Patent Document 1).

PRIOR ART REFERENCE

Patent Document

[Patent Document 1] JP8-215433A

Problem to be Solved

If the viewer can not only watch the game video but also be involved in the game, it is possible to distribute a game video that can enhance the satisfaction of the viewer. As a result, the number of viewers and the viewing time of the game video can be increased.

Means of Solving the Problem

To resolve the above-mentioned problem, a program is provided that causes a computer, which receives input operations from a distribution user and can connect to a game management portion that manages progress of a game and a distribution management portion, to execute:
 an operation data sending step that sends, to the game management portion, game operation data that is based on an input operation of the distribution user relating to a game in which a plurality of users participate;
 a progress data acquisition step that acquires, from the game management portion, game progress data that is based on the game operation data;
 a game progress step that displays a screen of the game that is based on the game operation data and the game progress data;
 a display control data sending step that sends, to the distribution management portion, display control data for displaying video of the game on a viewing user device; and
 a gift display step that receives, from the game management portion, gift data that is based on a gift output request sent from the viewing user device, and displays on the screen of the game a gift that is based on the gift data;
 wherein in the game progress step, an image corresponding to consecutive behaviors of the game is displayed on the screen of the game based on an instruction sent from the game management portion, when a specified command included in the game operation data sent from a user device used by any of the users participating in the game and the gift output request sent from the viewing user device cause the consecutive behaviors to be established.

To resolve the above-mentioned problem, a program is provided that causes a computer, which receives input operations from a viewing user viewing video, and which can connect to a distribution management portion, to execute:
 a display control data receiving step that receives from the distribution management portion display control data for displaying, on a display, a video of a game in which a plurality of users participate;
 an operation element display step that displays a user operation element for reflecting a gift in the game, on a game viewing screen on which video of the game is displayed; and
 a gift sending step that sends a gift output request that is based on an operation of the user operation element by the viewing user, including (i) identification information about a user who participates in the game and distributes video of the game or (ii) identification information about a group to which the user belongs, to a game management portion that manages progress of the game, via the distribution management portion.

To resolve the above-mentioned problem, a program is provided that causes a computer, which can connect to a distribution user device used by a distribution user who distributes video, a viewing user device used by a viewing user who views the video, and a game management portion that manages progress of a game, to execute:
 a step that sends to the viewing user device display control data for displaying video of a game in which a plurality of users participate;
 a step that receives from the viewing user device a gift output request for reflecting a gift in the progress of the game, including identification information about a user who participates in the game or identification information about a group to which the user belongs; and
 a step that sends the gift output request to the game management portion.

To resolve the above-mentioned problem, a program is provided that causes a computer, which can connect to game user devices used by game users who participate in a game, and a distribution management portion, to execute:
 a receiving step that receives from the game user devices game operation data that is based on input operations from game users for a game in which a plurality of game users participate;
 a step that sends to the game user devices game progress data that is based on the game operation data;
 a step that receives from the distribution management portion a gift output request for reflecting a gift in the game, sent from the viewing user device;
 a determination step that determines whether a specified command included in the game operation data sent from any of the game user devices and the gift output request sent from the viewing user device cause consecutive behaviors of the game to be established; and
 a consecutive behavior expression step that causes the consecutive behaviors to be expressed within the game when it is determined that the command and the gift output request cause the consecutive behaviors to be established.

Effects

According to this disclosure, it is possible to distribute a game video that can enhance the satisfaction of the viewer.

BRIEF EXPLANATION OF DRAWINGS

FIG. 2 is a diagram showing an example of a data structure of group data of the same embodiment.

FIG. 3 is a diagram showing an example of a data structure of game execution data of the same embodiment.

FIG. 5A shows a state in which combos are connected with a gift. FIGS. 5B and 5C show a state in which combos are not connected with gifts.

DETAILED DESCRIPTION OF EMBODIMENTS

First Embodiment

Hereinafter, a first embodiment of a video distribution system will be explained with reference to the drawings.

Video Distribution System

Figure 1:
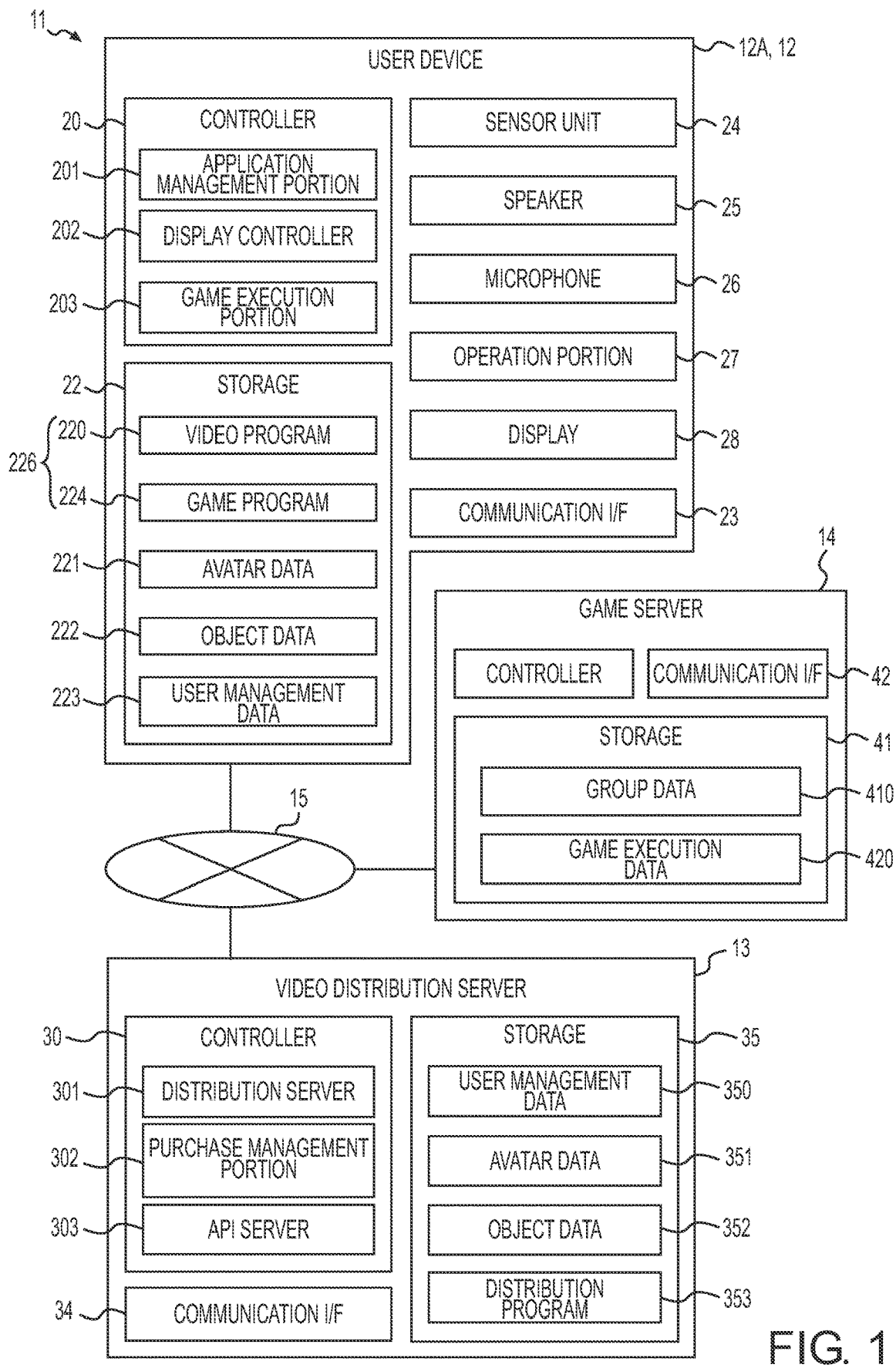
FIG. 1 is a schematic diagram showing an embodiment of a video distribution system according to a first embodiment.

As shown in FIG. 1, a video distribution system 11 includes a user device 12, a video distribution server 13, and a game server 14. The video distribution system 11 is a system that displays on the user device 12 a video including a game video (game live video) by sending and receiving data between a plurality of user devices 12, the video distribution server 13, and the game server 14 via a network 15. The video distribution server 13 corresponds to a distribution management portion, and the game server 14 corresponds to a game management portion.

In the user device 12, a video program for viewing and distributing a video is installed. The video program includes a distribution mode and a viewing mode. Hereinafter, a user who distributes a video in the distribution mode is called a "distribution user," and a user who views a video distributed by the distribution user in the viewing mode is called a "viewing user." A user is a viewing user when viewing a video, and is a distribution user when distributing a video. Further, when a description does not distinguish between the "distribution user" and the "viewing user," it is simply referred to as a "user."

User Device

The user device 12 is a smartphone (multifunctional telephone terminal), a tablet terminal, a personal computer, a so-called stationary console game machine, a wearable computer such as a head-mounted display or an eyeglass-type wearable terminal, or an information processing device other than these devices that can reproduce a video. The user device 12 may be a stand-alone device that operates independently, or may be constituted by a plurality of devices that are connected to each other so as to be able to send and receive various data.

The user device 12 shown in FIG. 1 is a user device 12 that can distribute a game video. The user device 12 includes a controller 20, a storage 22 (storage medium), and a communication interface (UF) 23. The controller 20 includes one or a plurality of arithmetic circuits such as a CPU (Central Processing Unit), a GPU (Graphic Processing Unit), and an NPU (Neural network Processing Unit). Further, the controller 20 includes a memory which is a main memory device (recording medium) to/from which the arithmetic circuit can read and write. The memory is constituted by a semiconductor memory or the like. The controller 20 reads an operating system and other programs from the storage 22 or an external storage into the memory, and executes a command(s) fetched from the memory. The communication OF 23 can send and receive data to and from the video distribution server 13, the game server 14, and other user devices 12 via the network 15. The network 15 includes various networks such as a local area network and the Internet.

The storage 22 is an auxiliary memory device (recording medium), and is, for example, a storage medium such as a magnetic disk, an optical disk, or a semiconductor memory. The storage 22 can also use a plurality of storages in combination. The storage 22 stores a video program 220, avatar data 221 for drawing an avatar object, object data 222, user management data 223, and a game program 224. The video program 220 and the game program 224 constitute a game video program 226. The user device 12 that distributes the game video stores the game video program 226 in the storage 22. Further, the user device 12 of a viewing user who does not distribute the game video but only views the game video does not have to store the game program 224 in the storage 22.

As needed, the controller 20 acquires various data from the video distribution server 13 by executing the video program 220. Further, the controller 20 receives an operation from the user, and may switch between a distribution mode in which the user himself distributes a video and a viewing mode in which a video distributed by another distribution user is viewed. For example, the distribution mode includes a game distribution mode in which a game video executed by a distribution user is distributed, and a normal distribution mode in which a video other than the game video is distributed.

The avatar data 221 is three-dimensional model data for drawing an avatar object. The user device 12 acquires data that updates the avatar data 221 from the video distribution server 13 at a predetermined timing, such as when the video program 220 is started. The avatar data includes data for drawing an avatar object body, texture data applied to the avatar object body, and the like. The data for drawing the avatar object body includes polygon data, skeleton data (bones) for expressing a movement of the avatar object, and the like. The avatar data 221 may include data for drawing a plurality of avatar object bodies. The texture data includes a plurality of parts data that can be applied to the avatar object. For example, a plurality of parts data is prepared for each category such as "eyes," "eyebrows," "ears," and "clothes." The user selects parts data and applies it to the avatar object body to create an avatar object. A combination of the avatar object body and the parts data selected by the user is recorded in the storage 22.

The object data 222 is data downloaded from the video distribution server 13 at a predetermined timing. The object data 222 is information regarding an object other than the avatar object. Objects other than the avatar object include objects that can be displayed by the distribution user and gifts provided by a viewing user to the distribution user. One type of gift is a wearable object that is displayed on a display screen in association with a predetermined part of the avatar object. The wearable object is, for example, an accessory (hat, glasses, or the like) attached to the avatar object, clothes (T-shirt or the like), or an object other than these that can be attached to an avatar object. Other objects include, for example, objects constituted by two-dimensional images such as fireworks and flames and two-dimensional particles, and objects having three-dimensional coordinates imitating stuffed animals and bouquets.

Further, the object may be an object that performs physical behavior. Specifically, the object may simulate a physical behavior such as falling due to gravity, motion due to application of force, or the like. A component (program) for simulating physical behavior is executably associated with a physical behavior object.

The user management data 223 includes user identification information (user ID) and data related to video distribution or viewing. The user management data 223 may include (i) user identification information (user ID), (ii) purchase media such as coins, (iii) points, (iv) a distribution status, and the like.

The game program 224 is a game application program installed in the user device 12. When the controller 20 executes the game program 224, the game proceeds. The game program 224 is executed by the controller 20 to acquire data necessary for the proceeding of the game from the video distribution server 13 as needed. The game program 224 may be a native application program which is installed in the user device 12 and in which the controller 20 directly performs arithmetic processing on the operation system. Alternatively, the game program 224 may a hybrid application that advances the game on a browser by using a markup language such as HTML (Hyper Text Markup Language), or by using CSS (Cascading Style Sheets), in addition to the program (component) installed in the user device 12.

The game program 224 may be installed as a plug-in for the video program 220. In this case, the video program 220 may be started, and a distribution start element (distribution start button), which is a GUI (Graphical User Interface) for starting distribution of the game video, may be displayed on the screen of the video application. Alternatively, the video program 220 may be installed as a plug-in for the game program 224. In this case, the game program 224 may be started, and a distribution start element (distribution start button), which is a GUI (Graphical User Interface) for starting distribution of the game video, may be displayed on the game screen.

The user device 12 is also provided with a sensor portion 24, a speaker 25, a microphone 26, an operation portion 27, and a display 28. At least one of the sensor portion 24, the speaker 25, the microphone 26, the operation portion 27, and the display 28 may be provided as the same device as the controller 20, or may be provided in a manner that connects to a device having the controller 20.

The sensor portion 24 is one or a plurality of sensors that detect face motion showing changes in facial expression of a user, and body motion showing changes in a relative position of a body of the user to the sensor portion 24. The face motion includes movements such as blinking of eyes and opening and closing of the mouth. The sensor portion 24 can be anything known to the public. One example of the sensor portion 24 includes a ToF sensor that measures and detects flight time (Time of Flight) until light irradiated toward the user is reflected by the user's face or the like and returns, a camera that shoots the user's face, and an image processor that processes the data shot by the camera. The sensor portion 24 may also include an RGB camera that captures visible light and a near-infrared camera that captures near-infrared light. For example, the True Depth of the "IPHONE X (registered trademark)" or the "LIDER" of the "IPAD PRO (registered trademark)," or any other ToF sensor in a smartphone may be used for the RGB camera and the near-infrared camera. This camera specifically uses a dot projector to project tens of thousands of invisible dots onto the user's face or the like. The reflected light of the dot pattern is then detected and analyzed to form a depth map of the face, and an infrared image of the face or the like is captured to capture accurate face data. An arithmetic processor of the sensor portion 24 generates various types of information based on the depth map and infrared image, and compares this information with registered reference data to calculate the depth of each point of the face (distance between each point and the near-infrared camera) and any misalignment of positions other than depth.

The sensor portion 24 may also have the capability to track not only the user's face, but also hands (hand tracking). The sensor portion 24 may further include sensors other than those described above, such as an accelerometer and a gyrosensor. The sensor portion 24 may have a spatial mapping function that recognizes an object(s) in the real space where the user is based on the detection results of the above-mentioned ToF sensor and other known sensors, and maps the recognized object(s) onto a spatial map. Hereinafter, the detection data of face motion and the detection data of body motion are simply referred to as "tracking data" when they are described without making any particular distinction. The image processor of the sensor portion 24 may be provided by the controller 20.

The speaker 25 converts audio data into audio and outputs it. The microphone 26 inputs the audio spoken by the user and converts it into audio data. The display 28 outputs various images in response to output instructions from the controller 20. The operation portion 27 is a touch panel integrated with the display 28, operation buttons provided on a housing or the like of the user device 12, a keyboard, a mouse, a controller, or the like. The controller may incorporate various known sensors such as an inertial measurement unit (IMU) such as an accelerometer and a gyrosensor. Another example of the operation portion 27 may be a tracking device that identifies the user's hand movement, eye movement, head movement, gaze direction, or the like. In this aspect, for example, based on the movement of the user's hands, the user's instructions can be determined, and various operations can be performed, such as starting or ending the distribution of a video, evaluating a message or video, requesting the display of a predetermined object (for example, a gift as described below), or the like. If the sensor portion 24 also has an input interface function such as a hand tracking function, the operation portion 27 can be omitted.

The controller 20 functions as an application management portion 201 and a display controller 202 by executing the video program 220 stored in the storage 22. The application management portion 201 executes main control of the video program. The application management portion 201 acquires user's requests or requests from the video distribution server 13, or the like, which have been input through the operation portion 27, and outputs the requests to the display control portion 202 according to the contents of those requests. The application management portion 201 also sends requests and various data from the display control portion 202 to the video distribution server 13, and sends tracking data acquired from the sensor portion 24 to the video distribution server 13. The application management portion 201 also records various data received from the video distribution server 13 in the storage 22.

In the distribution mode, the display controller 202 applies the tracking data acquired from the sensor portion 24 to the avatar data 221 to generate animation. In addition, the display controller 202 performs rendering, including avatar objects and objects other than avatar objects. Rendering here refers to a drawing process that includes acquisition of a position of a virtual camera, perspective projection, hidden surface elimination (rasterization), or the like. Rendering may be at least one of these processes, and may also include shading, texture mapping, or the like. Additionally, the display controller 202 generates animations using the rendered images. Further, the display controller 202 outputs to the display 28 video data that is a combination of (i) the animation and (ii) a posted message sent from the user device 12 of the viewing user, or (iii) a notification sent from the video distribution server 13, or the like.

In the distribution mode, the display controller 202 synchronizes the audio data and video data input from the microphone 26 and outputs them to the display 28. Further, the display controller 202 encodes the video data and audio data. The application management portion 201 sends the encoded data to the video distribution server 13.

Additionally, in the viewing mode, the display controller 202 generates animation by applying the tracking data of the distribution user, received from the video distribution server 13, to the avatar data 221. Further, objects other than the avatar object received from the video distribution server 13, posted messages, and the like are combined and are output to the display 28. In addition, the display controller 202 outputs the audio data received from the video distribution server 13 from the speaker 25 in synchronization with the video.

The controller 20 also functions as a game execution portion 203 by executing the game program 224 stored in the storage 22. The game execution portion 203 accepts an input operation from a user, proceeds with the game based on the input operation, and outputs the game screen to the display 28.

The application management portion 201 acquires the data for displaying the game screen from the game execution portion 203 and transmits it to the video distribution server 13. In this embodiment, the data for displaying the game screen is image data that incorporates (captures) the game screen as image information.

The user device 12 used by the distribution user that distributes the game video is referred to as a distribution user device 12A. Various programs stored in the distribution user device 12A and various programs stored in the user device 12 (viewing user device) used by the viewing user may be the same or may be different from each other. At least the distribution user device 12A stores the game program 224 in the storage 22 to distribute the game video, but the user device 12 used by the viewing user may not store the game program 224.

Distribution Server

Next, the video distribution server 13 will be explained. The video distribution server 13 is used by a service provider or the like who provides services for distributing a video. The video distribution server 13 is provided with a controller 30, a communication interface (I/F) 34, and a storage 35. The controller 30 has a similar configuration to the controller 20 of the user device 12. The controller 30 may be constituted by combining a plurality of arithmetic circuits. The communication I/F 34 and the storage 35 have a similar configuration to the user device 12. The video distribution server 13 may be constituted by a single device or a plurality of devices. If the video distribution server 13 is constituted by a plurality of devices, those devices are provided with the functions of the controller 30 and various data stored in the storage 35 in a distributed manner.

A distribution program 353 is stored in the storage 35. The controller 30 functions as a distribution server 301, a purchase processor 302, and an API server 303 by executing the distribution program 353.

The distribution server 301 has a server function to send and receive various types information related to the distribution and viewing of videos to and from the user device 12. The distribution server 301 stores various data received from the user device 12 in the storage 35 and outputs a request to the purchase processor 302 based on a purchase request or the like received from the user device 12. Further, the distribution server 301 acquires data requested by the user device 12 from the storage 35 or the like, and sends it to the user device 12. Specifically, the distribution server 301 sends a list of videos being distributed in response to a request from the user device 12 used by the viewing user. The distribution server 301 receives, from the user device 12, identification information of the video selected from the list. In addition, the distribution server 301 acquires the data for displaying the video from the user device 12 used by the distribution user of the selected video and sends it to the user device 12. Additionally, the distribution server 301 receives a posted message or the like posted by the viewing user for the video being distributed. Further, the distribution server 301 sends the received posted message to the user device 12 of the distribution user and the user device 12 of the viewing user. In addition to the content of the message, the posted message includes the identification information of the viewing user (user's account name or the like) and the date and time of posting. Additionally, messages displayed in the video include not only a message sent by the viewing user, but also a notification message automatically given by the video distribution server 13.

The distribution server 301 receives, from the user device 12 used by the viewing user, a request for a gift to be output to the video being viewed. The gift for which an output request is made in this embodiment includes an object provided by the viewing user to the distribution user who is distributing the video, a favorable evaluation of the video, or the like. The gift may be one for which an output request may be made without any reward, or for which an output request may be made by giving a reward. Alternatively, the gift may be one for which a reward is given when a display is made in response to the output request. The distribution server 301 sends the output request for the gift to the user device 12 of the distribution user and the user device 12 of the viewing user along with the identification information of the gift. The video distribution server 13 sends a notification message such as "User B sent fireworks as a gift" to the user device 12 of the distribution user and the user device 12 of the viewing user at a predetermined timing such as when the output request for the gift is accepted.

Additionally, when the distribution server 301 receives the data for outputting the game video from the user device 12 of the distribution user, it sends the data for outputting the game video to the user device 12 of the viewing user.

The purchase processor 302 performs a process of purchasing objects or the like according to the user's operation. The purchase process includes a process of giving a reward (medium) such as coins, points, and tickets that can be used within the video program. The purchase process may also include processes of exchange, sale, and transfer. Additionally, the purchase processor 302 may also perform a lottery (gatcha) in which a predetermined number of objects are selected from among a plurality of objects, by a reward being given. The purchase processor 302 records the purchased objects in at least one of the user device 12 and the video distribution server 13 in association with the user. When the user purchases an object in the distribution mode (or a closet mode before starting distribution), the purchase processor 302 may store identification information of the purchased object in the storage 35 in association with the user who purchased the object. When a user purchases an object in the viewing mode, the purchase processor 302 may store the identification information of the purchased object as a gift in the storage 35 in association with the distribution user who distributes the video. The proceeds of the purchasable object are distributed, for example, to the distribution user or a distribution service provider of the video. If a gift for a game video is purchased, the proceeds are provided to at least one of the distribution user, the distribution service provider of the video, and the game provider.

The API server 303 provides an interface (API: Application Programming Interface) for sending and receiving various types of information to and from the game server 14. The API server 303 sends and receives information regarding the distribution of game videos and information to be reflected in the game according to definitions.

Next, the various data stored in the storage 35 of the video distribution server 13 will be described. In addition to the distribution program 353, user management data 350, avatar data 351, and object data 352 are stored in the storage 35.

The user management data 350 is information regarding users who use the video program. The user management data 350 may include (i) user identification information (user ID), (ii) purchase media such as coins, (iii) points, (iv) a distribution status, and the like. The avatar data 351 is data that serves as a master for drawing avatar objects on the user device 12, and is sent to the user device 12 in response to a request from the user device 12.

The object data 352 is master data for drawing a gift on the user device 12, and is sent to the user device 12 in response to a request from the user device 12. The object data 352 includes data for drawing a gift, such as polygon data, as well as attribute information of the gift.

Game Server

Next, the game server 14 will be described. In this embodiment, the game server 14 advances a game that progresses in group units (group unit game). This type of game includes group battle games (so-called GvG games) in which "guilds," which are groups, play against each other, games in which users belonging to a group cooperate to progress through stages, and the like. In this embodiment, the game advanced by the game server 14 will be described as a GvG game. The game may be, for example, a role-playing game, a shooting game, an action game, a racing game, a hand-to-hand combat game, a training simulation game, a romance simulation game, a puzzle game, a card game, a sports game, a rhythm game, or the like.

The game server 14 includes a controller 40, a storage 41, and a communication interface (I/F) 42. The controller 40, the storage 41, and the communication interface (I/F) 42 have the same configuration as those of the user device 12 or the video distribution server 13.

Group data 410 and game management data 420 are stored in the storage 41. The group data 410 is data showing users belonging to the group. The game management data 420 is data showing identification information of groups that are competing against each other.

Next, the group data 410 and the game management data 420 will be described with reference to FIGS. 2 and 3.

As shown in FIG. 2, the group data 410 includes a group ID 411 and a user ID 412. The group ID 411 is group (guild) identification information. The user ID 412 is identification information of users belonging to the group. Groups are formed to play games. The groups may be temporarily formed when a group battle game is started, or may be formed in advance such that a predetermined number of people is selected when a group battle game is started.

As shown in FIG. 3, the game management data 420 is data generated for a group battle game, and includes game ID 421, group ID 422, and user ID 423. The game ID 421 is identification information assigned to each group battle game. The group ID 422 is associated with the game ID 421 and shows the groups that will play in the group battle game corresponding to the game ID 421. A group that plays the group battle game is a predetermined number of users selected from the users belonging to the group shown by the group data 410. A group may be joined by users who announce their participation, or a user who belongs to the group may invite other users to join. Additionally, in a game in which a group progresses through stages independently, one group ID 422 is associated with the game ID 421. Further, the game ID 421 may be associated with three or more groups. The user ID 423 is associated with the group ID 422. The user ID 423 shows users who participate in the group battle game. For example, if the number of users belonging to the group is "10" and the number of users who can participate in the group battle game is "3," "3 people" selected from "10 people" based on a predetermined selection condition, or wishing to participate, can participate in the group battle game.

The video distribution server 13 and the game server 14 provide functions of distributing videos and advancing games, respectively, by having the distribution program 353 and a game management program (undepicted) installed on devices that can execute those programs. Therefore, the video distribution server 13 and the game server 14 do not necessarily constitute separate devices. For example, the video distribution server 13 and the game server 14 may be provided in a single device. Also, the video distribution server 13 and the game server 14 may have their functions distributed among a plurality of devices. Further, the video distribution server 13 mainly has a video distribution function, but may also have at least one of the functions of the game server 14. The game server 14 mainly has a function of advancing games, but may also be provided with at least one of the functions of the video distribution server 13. The user device 12 has a function of distributing and viewing videos according to the user's operation, but may be provided with at least one of the functions of the video distribution server 13, and/or at least one of the functions of the game server 14.

Gift from Viewing User

Next, a gift given from the viewing user to the distribution user via the video will be described in detail. In this embodiment, the gift is given to the distribution user, triggered by the sending of the gift output request by the user device 12 used by the viewing user. Further, the gift can be considered as a gift given to a video, an avatar object, or a group to which the distribution user belongs, in addition to the distribution user.

The gift can be given from the viewing user to the distribution user in both the normal distribution mode and the game distribution mode. When a gift output request is sent from the viewing user's user device 12 in the normal distribution mode, the gift given by the viewing user is displayed in the video. By displaying the gift in the video, the viewing user can support the distribution user and motivate the distribution user. Further, the distribution user does not simply unilaterally distribute the video, but the distribution user can react to the gift given by the viewing user, so that a communication opportunity between the distribution user and the viewing user can be increased.

Providing a gift(s) in the game distribution mode performs a basic function of displaying the gift in the video, as well as a function of reflecting the gift in the game. The gift may be reflected in the game such that the group to which the distribution user to whom the gift is given belongs can progress favorably in the game. The phrase "reflect the game in one's favor" includes a case in which it is sufficient that at least an action intended to provide an advantage is performed, but without an actual favorable result.

Additionally, the gift may be reflected in the game so that the game advances unfavorably for a group, or a predetermined number of users of the group, that plays against the group to which the distribution user to whom the gift is given belongs. For example, by giving a gift, parameters such as attack capability, defense capability, durability, and physical strength of an opponent's group or user, and various parameters such as items and points, may be reduced.

Further, not limited to the above example, the gift may be reflected in the game such that the game progresses unfavorably for the group to which the distribution user to whom the gift is given belongs. An example of such a game would be a game in which the group to which the distribution user belongs and the viewing user compete against each other. For example, the viewing user may cause an object to appear as a gift that interferes with the progress of the game of the user to which the distribution user belongs. Even in such a case, if the viewing user does not give a gift, the game cannot be established, and the gift given by the viewing user makes the game exciting, so it can be a gift to the distribution user. That is, the gift given by the viewing user may be reflected in the game in a manner that matches the content of the game.

A gift given in the game distribution mode does not necessarily have to be displayed as an object in the video. For example, when a gift output request is sent from the user device 12 used by the viewing user, the parameters associated with the distribution user may be changed to give an advantage in the game, and only values and gauges of the parameters displayed on the screen may be changed. Further, when a gift output request is sent from the user device 12 used by the viewing user, actions, skills, and the like, such as killer technique, may be given to game media such as characters, avatars, cards, and the like associated with the distribution user or a user belonging to the same group as the distribution user. For example, the user can make the game medium express actions or make it capable of expressing special skills. When a gift output request is sent from the user device 12 used by the viewing user, a reward given to the distribution user or the like that is separate from the gift given by the viewing user may be increased by the gift from the viewing user.

Video Distribution Method

As a video distribution method, (i) a video distribution method in which the user device 12 used by the distribution user generates and encodes video data and sends the video data to the user device 12 used by the viewing user, and (ii) a client rendering method in which the user device 12 used by the viewing user and the user device 12 used by the distribution user acquire the data necessary to generate the video, and generate the video, may be used. In this embodiment, a method of displaying a video on the user device 12 using an image distribution method is explained. Further, it may be a hybrid method in which the user device 12 used by the viewing user renders an object or the like and performs other image processing, using the video data generated by the user device 12 used by the distribution user. Alternatively, the video distribution server 13 or other server may generate video data, or it may be another video distribution method.

Game Video Distribution

Next, distribution of the game video using the video application will be described with reference to FIGS. 4 and 5.

Figure 4:
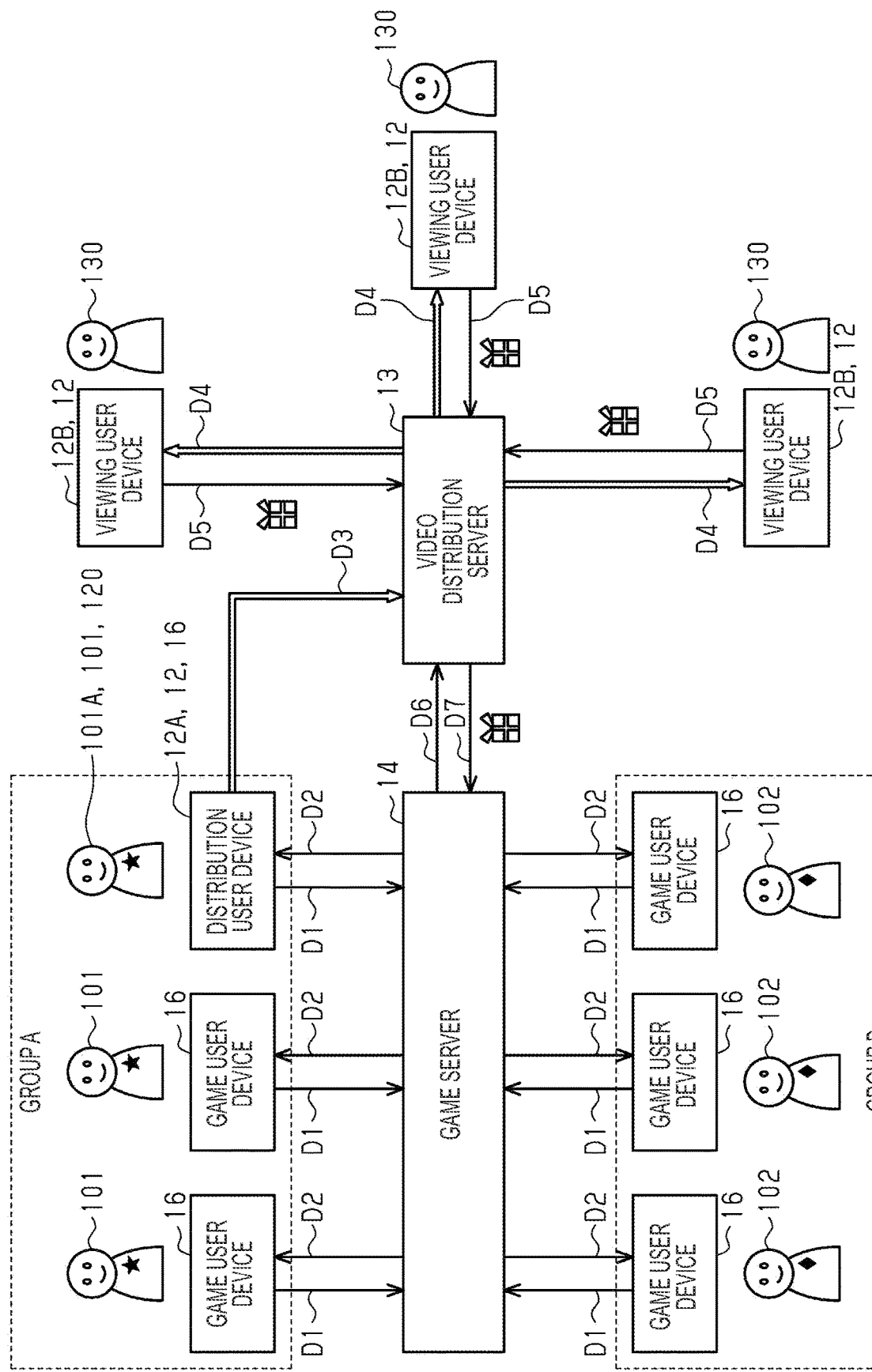
FIG. 4 is a diagram schematically showing a network and types of data sent and received in the same embodiment.

FIG. 4 shows a case where Group A and Group B participate in a group battle game. In the example of FIG. 4, an upper limit is set for the number of people who can participate in the group battle game. For example, Group A is composed of three game users 101, and Group B is composed of three game users 102. Of these, the user 101A belonging to Group A serves not only as a game user who plays the game but also as a distribution user 120 who distributes the game video.

Of the game users 101 and 102, the users other than the distribution user 120 use game user devices 16. The game user devices 16 may be any devices capable of executing a group battle game, and have the game program 224 installed. The video program 220 may be installed, or may not be installed, in the game user devices 16 used by the game users. The video program 220 and the game program 224 are installed in the user device 12 used by the distribution user 120. Hereinafter, the user device 12 used by the distribution user 120 is referred to as a distribution user device 12A. That is, the distribution user device 12A is a user device 12 in which the video application is set to a distribution mode. Since the distribution user device 12A also serves as a game user device 16, when the description does not distinguish between the distribution user device 12A and the game user device 16 regarding processing related to the game, the device will be described as a game user device 16.

Further, the user devices 12 used by viewing users 130 who view the game video are referred to as viewing user devices 12B. That is, the viewing user devices 12B are user devices 12 in which the video application is set to a viewing mode.

When the group battle game is started, the game user devices 16 accept input operations of the game users 101 and 102 to the operation portions, advance the game, and display the game screen on the display. Further, the game user device 16 sends game operation data D1 based on the input operations of the game users 101 and 102. For example, the game operation data D1 includes various commands such as an attack command, a defense command, or an item selection, and the like. Further, the game operation data D1 may include a message input by a user to the operation portion and audio data input via the microphone of the game user device 16.

The game server 14 generates game progress data D2 based on the game operation data D1 received from the game user devices 16 and sends the game progress data D2 to the game user devices 16. The game operation data D1 and the game progress data D2 may be the same data, or a plurality of game operation data D1 may be integrated into the game progress data D2. In addition to commands and messages sent from the game user devices 16, the game progress data D2 includes a parameter for each group such as a score of the group, a parameter such as the HP of each character, victory/defeat information such as whether each character has been defeated, the remaining time of the group battle game, and the like. As a result, for example, an attack command sent by the game user device 16 used by a game user 101 is sent to each of the game user devices 16 used by the other game users 101.

The game user devices 16 advance the group battle game based on the input operations of the game users 101 and 102 operating the game user devices 16 themselves, the game progress data D2, and the like. For example, when the group battle game is a game in which characters corresponding to the game users 101 and 102 attack each other, a parameter such as the HP of another character or the entire group is lowered in response to the attack of one character. At this time, a parameter of the attacking character or the group to which the character belongs may be increased. In addition, if the game progress data D2 includes a parameter for each group or a parameter such as the HP or the like of each character, the parameter is updated. When the game progress data D2 includes a message or audio, the message is displayed on the game screen or the audio is output from the speaker.

Further, based on the game operation data D1 and the game progress data D2, the game server 14 determines whether a combo that is a consecutive behavior is established between the users 101 belonging to "Group A" or between the users 102 belonging to "Group B." Combos change according to the content of the game. For example, in an action game, consecutive moves (consecutive attacks) or the fact that consecutive moves are performed in a specified order can be listed. In a card game, for example, a combination of specified cards can be listed. Further, in a sports game, the combo could be some action that is successively successful, and in a puzzle game, the combo could be that puzzles are erased consecutively, or that puzzle elements are connected in a predetermined order, or the like.

When a combo is established, the game server 14 produces a predetermined effect, for example an increase in a user parameter such as attack capability, defense capability, durability, physical strength or the like, an increase in damage to an opponent, or acquisition of items, points, or the like. When a combo is established, the in-game effect is larger than in normal times when the combo does not occur. For example, an effect is generated in which the group in which the combo is generated advances the game in an advantageous manner. The effect of the combo is an increase in a user parameter such as attack capability, defense capability, durability, physical strength or the like, an increase in damage to an opponent, or acquisition of items, points or the like.

When the combo is established, the game server 14 includes the combo and the combo generation instruction for generating the effect in the game progress data D2 and sends the combo to the game user devices 16. The game user devices 16 generate the combo based on the combo generation instruction included in the game progress data D2, reflect the combo effect in the game, and display an image showing the combo effect.

Further, even if a gift is given and a combo is not established, the gift may be reflected in the progress of the game. For example, as the sum of the number of gifts or of numerical values weighted according to the content of the gifts increases, the amount of reward given to the distribution user 120 or to a game user 101 other than the distribution user 120 of the group to which the distribution user 120 belongs or to the entire group may be increased, or the value of the rewards may be increased. Alternatively, as the sum of the number of gifts or of the numerical values weighted according to the content of the gifts increases, the effect (power) of the technique of the game medium such as a character may be increased (may be strengthened).

Further, regardless of whether the combo is established, the influence on the game may be changed depending on the attribute and type of gift. For example, the influence on the game may be changed depending on whether the gift is a paid gift that requires compensation or a free gift that does not require compensation. For example, in the case of a paid gift, the influence of the game may be increased so that the progress of the game of the group to which the distribution user belongs is advantageous. Alternatively, only free gifts may be distributed to the video. Alternatively, the greater the compensation required to send a gift output request for a paid gift, the greater the impact may be on the game. Further, in the video application, when it is possible for users to follow each other, the influence of a gift from a follower may be increased. Also, if a gift that can be given when the video is not distributed can also be given during video distribution, the influence on the game of the gift given during video distribution and the influence on the game of the gift given at a time other than this may be different. For example, the influence of the former gift on the game may be greater than the influence of the latter gift on the game.

On the other hand, the game user device 16 also serving as the distribution user device 12A captures the game screen as image information. Further, the game user device 16 sends video data D3 in which the image information is encoded to the video distribution server 13. The video distribution server 13 sends video data D4 to the viewing user devices 12B. The video data D4 sent from the video distribution server 13 to the viewing user devices 12B may include a message or the like received from the viewing user devices 12B. The viewing user devices 12B decode the video data D3 and output the game video to the display 28.

Further, a viewing user 130 performs an input operation for giving a gift to the distribution user 120 while viewing the game video. The viewing user device 12B accepts the input operation of the viewing user 130 and sends a gift output request D5 to the video distribution server 13. The gift output request D5 includes the identification information (distribution user ID) of the distribution user 120 corresponding to the video being viewed, or the identification information (group ID) of "Group A" to which the distribution user 120 belongs. Further, the gift output request D5 may include identification information (game ID) of the group battle being played by "Group A" to which the distribution user 120 belongs. Further, if the viewing user 130 can specify a game user 101 to whom to give a gift, the identification information of the game user 101 may be included. In addition, if the type of gift can be selected, the identification information of the gift may be included. Further, the gift output request D5 may include the identification information of the viewing user who is the giver of the gift.

When the video distribution server 13 receives the gift output request D5, the video distribution server 13 accumulates such as gift data D7 in the storage 22. The gift data D7 may include the account name and the like of the viewing user 130 who gave the gift. The game server 14 sends a request D6 for the gift data D7 at a predetermined timing. The video distribution server 13 sends the gift data D7 to the game server 14 in response to the request D6. When at least a predetermined number N1 of the gift data D7 is accumulated, the accumulated gift data D7 may be divided into a predetermined number N2 (N2≤N1) and sent.

When the game server 14 receives a plurality of gift data D7 from the video distribution server 13, the received gift data D7 may be divided into a predetermined number, and the divided gift data D7 may be reflected in the game.

The game server 14 determines whether a combo has been generated between the users 101 belonging to "Group A" or between the users 102 belonging to "Group B," and in addition, determines whether the gift data D7 and the operation data D1 received from the game user device 16 satisfy a combo establishment condition. For example, the game server 14 determines that the combo establishment condition is satisfied when it is determined that the gift data D7 is consecutively received after receiving a predetermined command from the game user device 16. Further, if it is determined that the gift data D7 has been received within a predetermined time from the time when the predetermined command is received from the game user device 16, it is determined that the combo establishment condition is satisfied.

Alternatively, when the game server 14 determines that a command received from the game user device 16 and the gift data D7 satisfy a specified order, the game server 14 determines that the combo establishment condition is satisfied when reception is determined. For example, if it is determined that the gift data D7 was received after the game server 14 received a command for a specified technique from the game user device 16, it is determined that the combo establishment condition has been satisfied. Alternatively, if it is determined that the gift data D7 was received after the appearance of a specified game medium such as a card or a character, it is determined that the combo establishment condition is satisfied.

Alternatively, when the game server 14 consecutively receives commands or gift data D7 sent from the game user device 16 during a predetermined period in which the combo can be established, the game server 14 determines that the combo establishment condition is satisfied.

When the game server 14 determines that the combo has been established, the game server 14 includes a combo generation instruction in the game progress data D2 and sends the combo generation instruction to the game user device 16. The game user device 16 generates a combo in the game based on the combo generation instruction, reflects the effect of the combo in the game, and displays an image showing the effect of the combo. At this time, the account name of the viewing user who gave the gift may be displayed on the game screen.

When a distribution user 120 is also included in "Group B," the distribution user device 12A used by the distribution user 120 in "Group B" also sends video data D3 to the video distribution server 13. The video data D3 sent from the distribution user device 12A used by the distribution user 120 of "Group B" is sent to the viewing user devices 12B that output the video of the distribution user 120. The same applies when a plurality of distribution users 120 is included in one group.

Figure 5A:
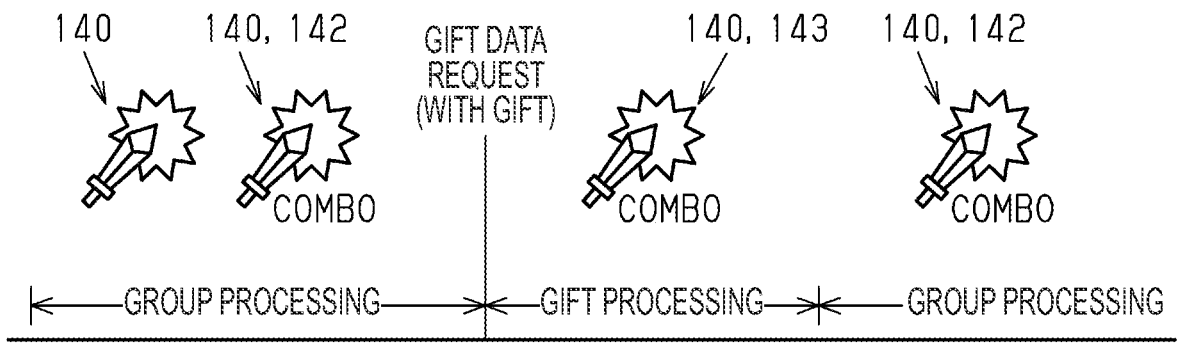
FIGS. 5A, 5B, and 5C are diagrams showing examples of generation of combos in the same embodiment.

FIG. 5 schematically shows a timing of combos connected by a game user 101 and a viewing user 130. As shown in FIG. 5A, the game server 14 alternately performs group processing for processing the game operation data D1 sent from the game user devices 16 of the game users 101 and 102, and gift processing for processing the gift data D7. Group processing includes the processing of the game operation data D1 of "Group A" and the processing of the game operation data D1 of "Group B."

When the game server 14 receives the gift data D7 and determines that the gift data D7 satisfies the combo establishment condition after the combo 142 is established by an action 140 of the game user 101 generated in the group processing, a combo 143 is further connected to the combo 142. The combo 143 generated in gift processing may be one or a plurality. Further, when the action 140 based on the game operation data D1 received in the next group processing satisfies the combo establishment condition, the combo 142 is further connected. Even if the combo 142 does not occur in the group processing, the combo is established if the action 140 that occurred during the period for executing group processing and the action 140 that occurred during the period for executing gift processing are consecutive.

At this time, the effect of the combo 142 generated in group processing and the effect of the combo 143 generated in gift processing may be different. For example, the damage dealt to the opponent by the former combo 142 may be larger than the damage dealt to the opponent by the latter combo 143. Alternatively, the damage dealt to the opponent by the former combo 142 may be smaller than the damage dealt to the opponent by the latter combo 143. Alternatively, the effect generated by the former combo 142 and the effect generated by the latter combo 143 may be different.

Figure 5B:
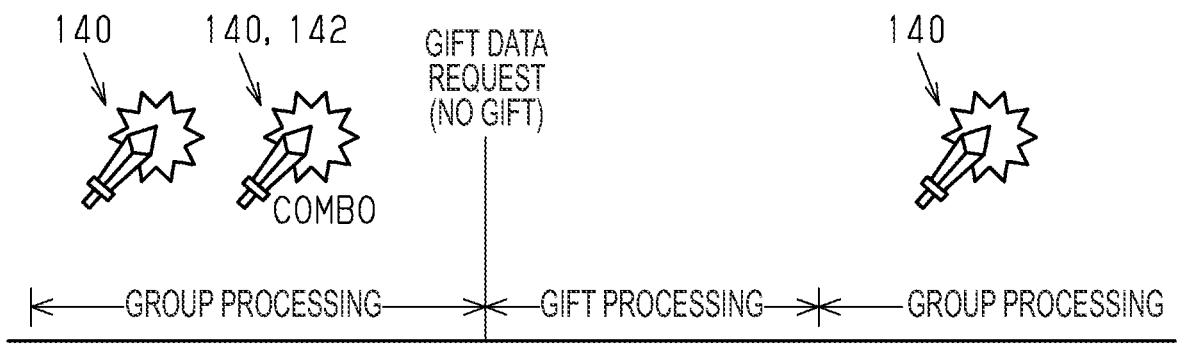

As shown in FIG. 5B, even if the combo 142 is generated in group processing, the combo is interrupted when the gift data D7 is not received in gift processing, or when the combo establishment condition is not satisfied in gift processing. Therefore, as compared with the case shown in FIG. 5A, the in-game effect of the combo is reduced.

Figure 5C:
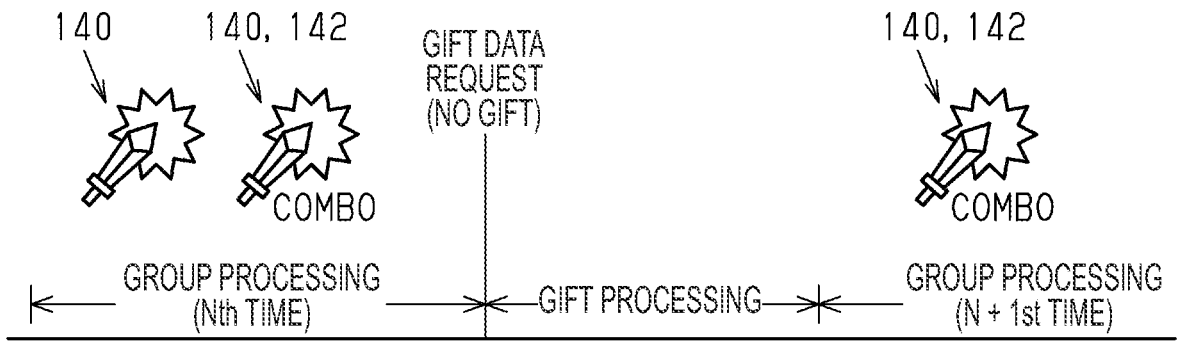

As shown in FIG. 5C, if the action 140 generated in the "Nth" group processing and the action 140 generated in the "N+1$^{st}$ time" group processing satisfy the combo establishment condition, it may be determined that the combo 142 is established even if the gift data D7 is not received in the process.

Figure 6:
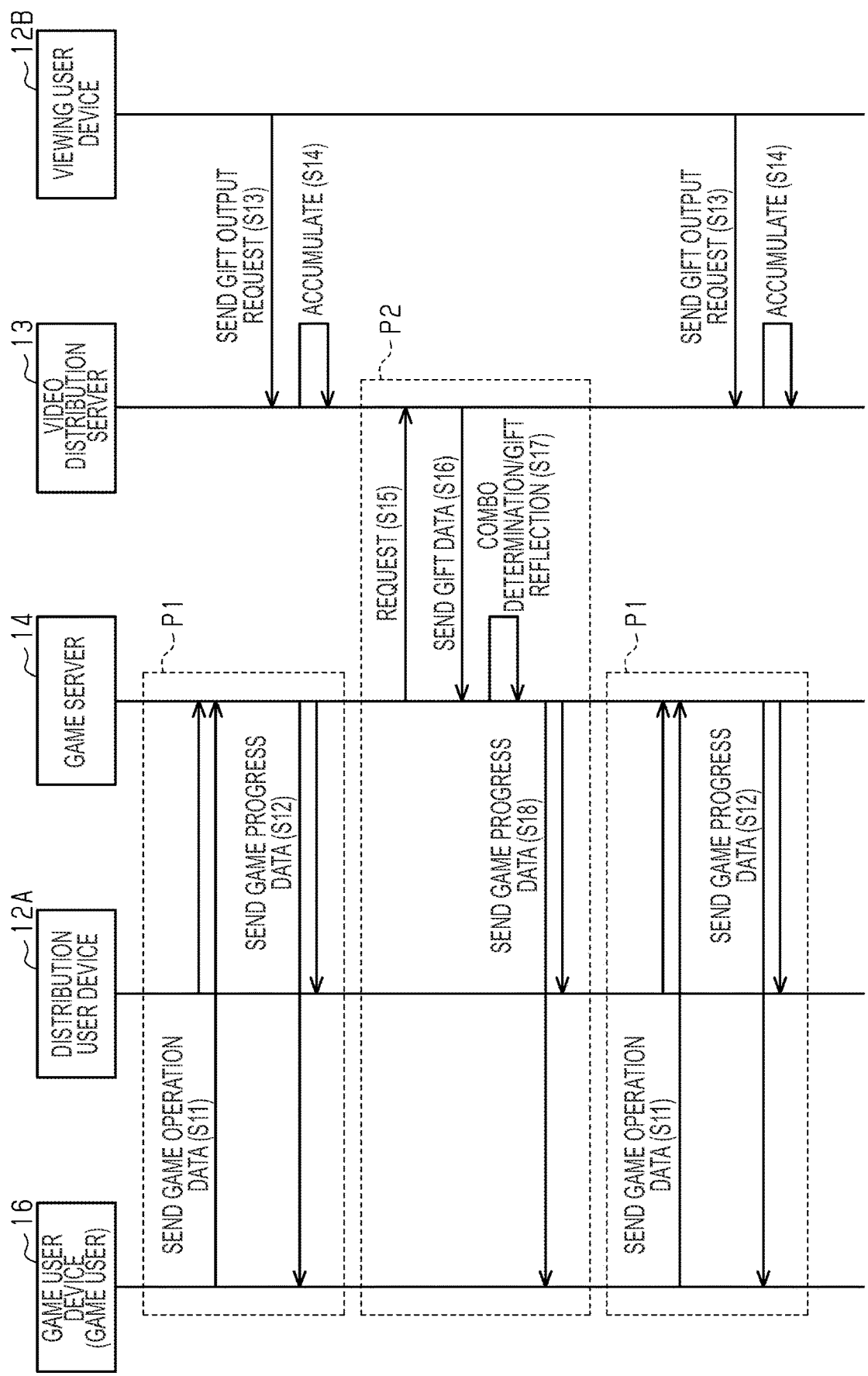
FIG. 6 is a sequence chart showing processing sequences regarding an output of a gift in the same embodiment.

Next, with reference to FIG. 6, the processing sequences of the game user device 16, the distribution user device 12A, the video distribution server 13 and the game server 14 will be described. A game user 101 participating in a group battle game may have experience playing the game before the group battle game is newly started. In this case, the game server 14 stores the identification data of the game user 101, a game medium associated with the game user 101, a parameter associated with the game user 101, and the like. The distribution user device 12A used by the game user 101 may first execute a game program 224 based on an input operation of the game user 101, log into the game server 14 using the in-game identification data of the game user 101, and use the information about the game user 101 stored in advance in the game server 14. Further, even if the game user 101 has played the group battle game, the group battle game may be executed without using information about the game user 101 stored in advance in the game server 14.

The game server 14 determines whether the number of game users 101 belonging to the group has reached a predetermined number and the group has been formed. Alternatively, the game server 14 performs an operation instructing the start of the group battle game and determines whether group formation is completed. When a group of game users 101 is formed, matching (combination) with another group is performed based on attributes such as the level or other parameters of each game user constituting the group. Matching may also be done by a game user belonging to the group selecting from a list of opponents. When matching is completed, the group battle game is started. Characters and the like belonging to another group that plays against the game user 101 may be NPCs (Non-Player Characters) controlled by the game server 14. Further, when the group to which the game user 101 belongs does not reach capacity, the game server 14 may execute the game as NPCs in place of game users who are lacking.

Further, in "Group A," one or a plurality of game users 101 may become distribution users 120 to distribute the video, and in "Group B," there may not be a game user 102 who becomes a distribution user 120. In this case, only "Group A" can receive gifts from viewing users 130. Therefore, "Group A" can advance the game advantageously. Alternatively, both "Group A" and "Group B" may include a distribution user 120.

When the game user device 16 logs in to the group battle game and the group battle game is started, the game user device 16 and the distribution user device 12A send game operation data D1 to the game server 14 (Step S11). The game server 14 sends game progress data D2 that is based on the received game operation data D1 to the game user device 16 and the distribution user device 12A (Step S12). Steps S11 and S12 are included in group processing P1.

Meanwhile, the viewing user device 12B sends a gift output request D5 to the video distribution server 13 (Step S13). The video distribution server 13 accumulates gift data D7 based on the gift output request D5 (Step S14).

Upon finishing the group processing, the game server 14 sends a gift data request D6 to the video distribution server 13 (Step S15). The video distribution server 13 sends the gift data D7 accumulated in Step S14 to the game server 14 (Step S16). The game server 14 determines whether a combo has been established and performs a process for reflecting the gift data D7 in the group battle game (Step S17). Steps S15 to S17 are included in gift processing P2.

Upon finishing the gift processing P2, the game server 14 executes the group processing P1. Then, the gift processing P2 and the group processing P1 are repeated until the group battle game is completed.

Game Viewing Screen

Next, the distribution screen displayed on the user device 12 will be described with reference to FIGS. 7 to 14. Here, the explanation is given by exemplifying a group battle game in which characters attack each other, but the group battle game is not limited to this type of game.

Figure 7:
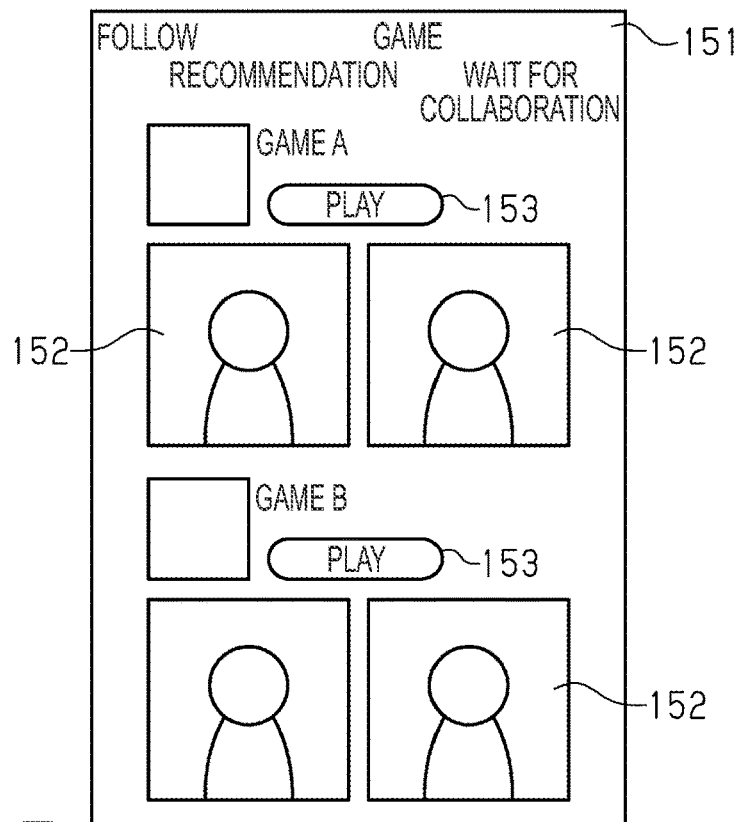
FIG. 7 is a diagram showing a game list screen of the same embodiment.

FIG. 7 is a game list screen 151. The game list screen 151 is displayed on the display 28 of the distribution user device 12A and the viewing user device 12B. On the game list screen 151, thumbnail images 152 of the game videos being distributed and play start operation portions 153 are displayed for each game. When the user selects a thumbnail image 152, the user device 12 enters the viewing mode, and the game video is displayed on the display 28. When the user operates a play start operation portion 153, the user device 12 enters the distribution mode and the game is started. Then, the distribution user device 12A of the distribution user 120 who has started the game sends to and receives from the game server 14 the game operation data D1 and the game progress data D2, and also sends the video data D3 to the video distribution server 13. When the distribution user 120 starts a game in which a group battle is performed, it is not necessary to start distribution of the video until the number of game users 101 participating in the same group as the distribution user 120 reaches a predetermined number. The user interface for distributing the game video is not limited to the above game list screen 151. For example, the group battle game may be started from a game start button or the like displayed on a video distribution screen.

Figure 8:
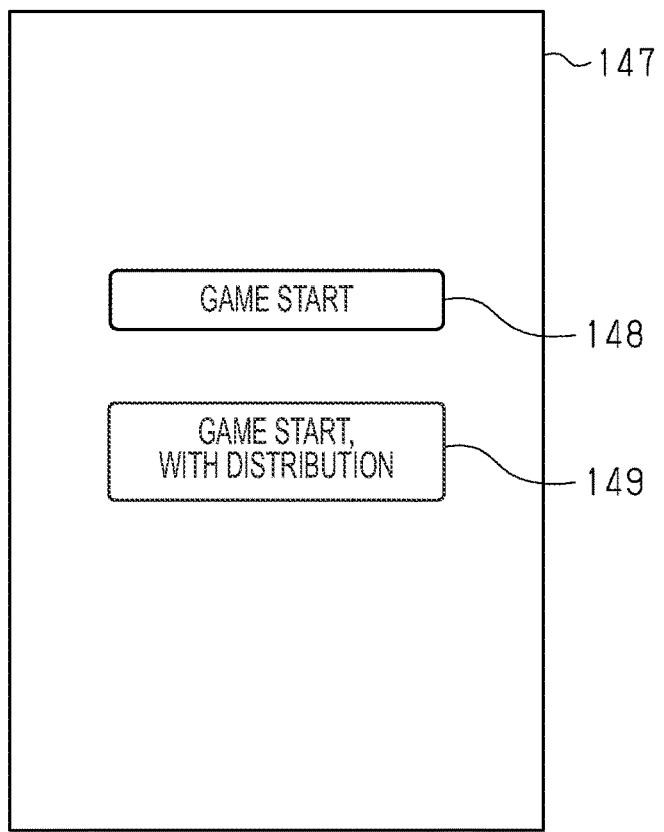
FIG. 8 is a diagram showing a game distribution screen at the time of starting the game of the same embodiment.

FIG. 8 is an example of a game distribution screen 147 at the start of the game displayed on the distribution user device 12A. The game distribution screen 147 includes a distribution start element 149, which is a GUI for starting the distribution of the game and the game video, and a game start element 148 for starting the game without distributing the game video. When the distribution start element 149 is operated by the distribution user 120, the distribution user device 12A executes the video program 220 in addition to the game program 224. The distribution start element 149 may be displayed on the game screen after the game is started.

Figure 9:
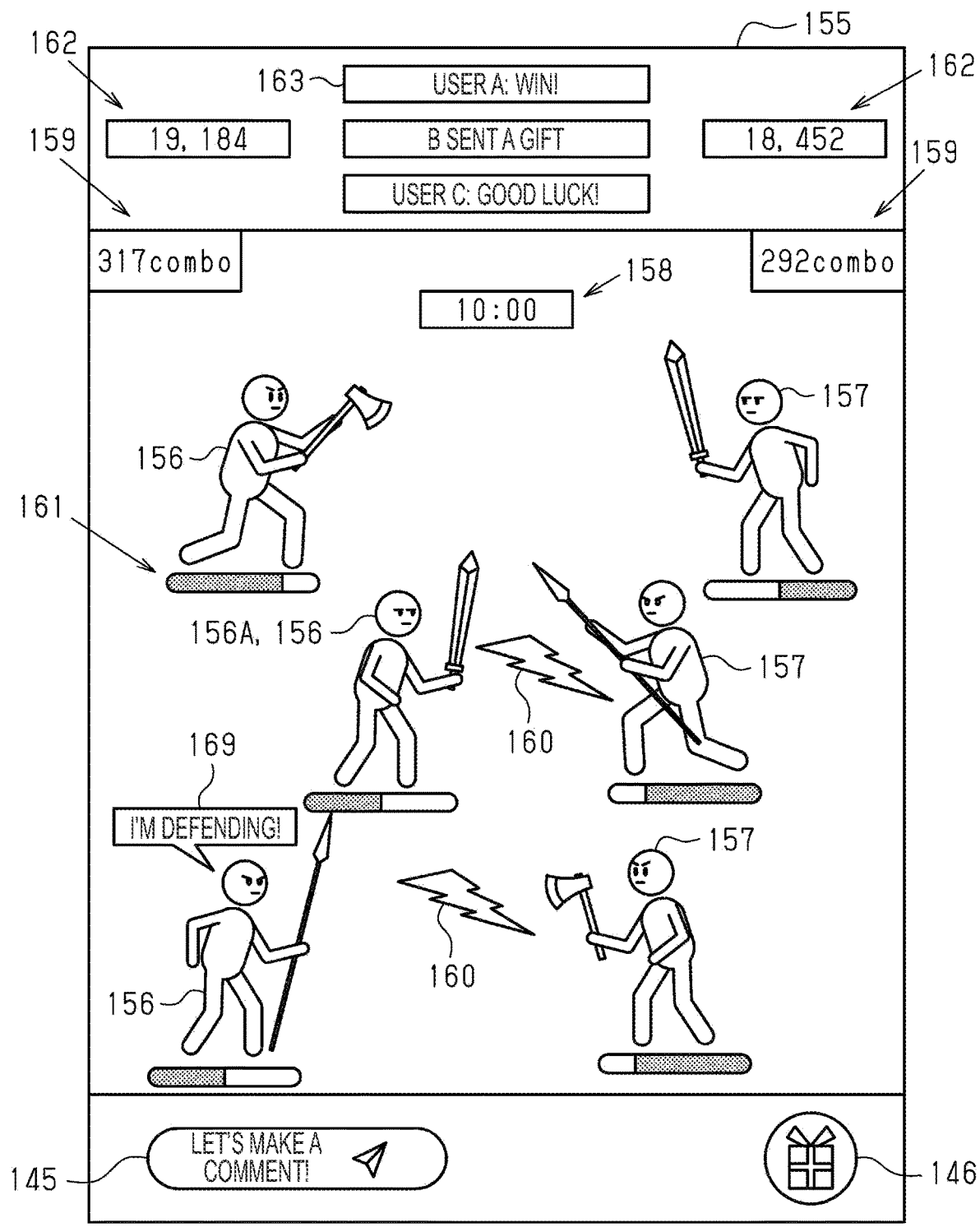
FIG. 9 is a diagram showing a game viewing screen displayed on a viewing user device of the same embodiment.

FIG. 9 is an example of a game viewing screen 155 of a group battle game. The game may be a turn-based game in which the order of attacks is alternated, or may be a non-turn-based game. The game viewing screen 155 includes characters 156 corresponding to game users 101 belonging to "Group A" and characters 157 corresponding to game users 102 belonging to "Group B." A character 156 attacks an opponent character 157 according to the game operation data D1. For example, when an attack is made from a character 156A to another character 157, a production display 160 that directs the attack is displayed in association with the character 156A. Further, a character 157 attacks the character 156, which is the opponent of that character 157, based on the game operation data D1. Gauges 161 indicating HP are displayed on the characters 156 and 157, respectively. Further, the game viewing screen 155 includes point displays 162 acquired by performing attacks or the like. Further, the game viewing screen 155 includes a time display portion 158 indicating the elapsed time or the time remaining until the end of the game, and combo display portions 159 indicating the occurrence status of combos. Further, the game viewing screen 155 includes a message display portion 163 on which messages sent from viewing users are displayed.

Further, the viewing user device 12B displays a message input portion 145 and a gift button 146 on the game viewing screen 155. The message input portion 145 is an interface that allows the viewing user to input a message (comment). Further, the gift button 146 is an interface that allows the viewing user to send a gift output request to the video distribution server 13. The gift button 146 corresponds to a user operation element for reflecting the gift in the game.

When a character 156 attacks consecutively, a combo is generated. At this time, for example, a combo number displayed on the combo display portion 159 increases by a predetermined amount. In addition, a production display may be performed in association with the generation of the combo.

When an end condition of the group battle game is satisfied, the game ends. For example, when the HP of a character 156 disappears, that character 156 is in a defeated (conquered) state. When one group defeats all the characters belonging to the other group, it is determined that the one group has won and the game ends. Alternatively, the end condition may be that the time limit of the game has been reached. In this case, the group with the most points earned within the time limit may be determined as the winning group.

Figure 10:
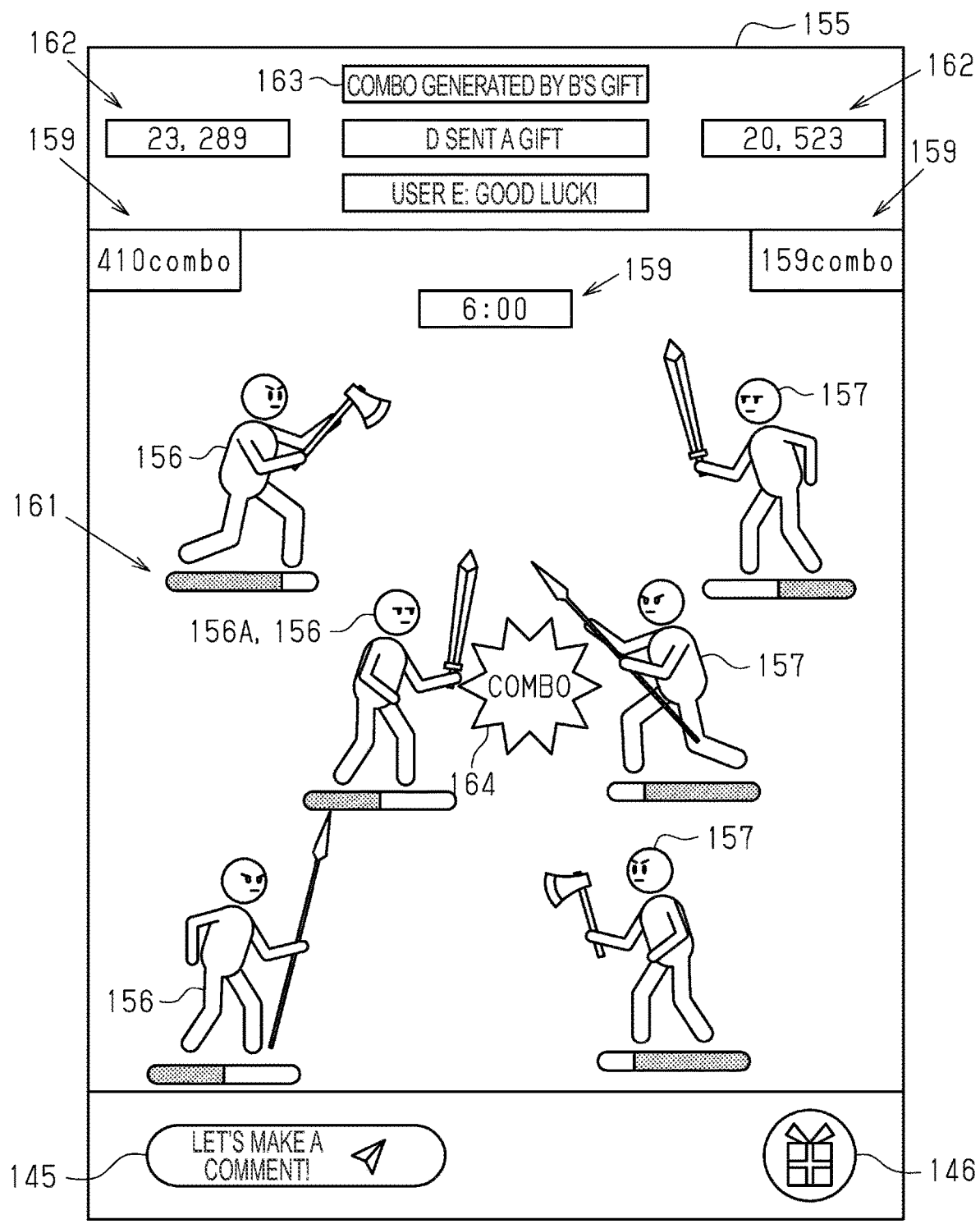
FIG. 10 is a diagram showing the game viewing screen displayed on the viewing user device of the same embodiment.

FIG. 10 is a screen for when a gift is given by a viewing user 130. In the example of FIG. 10, a gift 164 is displayed in association with a character 156A corresponding to the distribution user 120. The gift 164 is, for example, an attack on a group that is an opponent of a group supported by a viewer. The gift 164 may be identifiable as an object belonging to the character 156A or the group in which the character 156A participates from the viewpoint of the viewing user 130, the game user 101, or the like, and is not particularly limited as long as such can be displayed on the video, and can be changed according to the content of the game. For example, the gift 164 may be an effect object associated with an action such as a technique activated by the character 156A. At this time, the gift 164 and the production display 160 (see FIG. 9) based on the action activated by the operation of the game user 101 may be displayed in different display modes.

Alternatively, the gift may be an item such as a weapon, or clothes or other attachments possessed by a character 156. Alternatively, the gift may change the field, background, or the like. Alternatively, the gift given by the viewing user may be an increase (or decrease) in a parameter of a game user 101 such as a character. In this case, the gift is displayed as a numerical value indicating a parameter, a gauge, or the like on the game viewing screen 155.

In addition, when a plurality of distribution users 120 exists in the same group or different groups, a gift given by a viewing user 130 may be displayed in association with the character of the distribution user 120 that is the distribution source of the video viewed by the viewing user 130. For example, when a plurality of distribution users 120 is included in "Group A," a gift given by a viewing user 130 who watches the video distributed by one distribution user 120 is displayed in association with the character 156 positioned at the highest position in FIG. 10 corresponding to the one distribution user 120. A gift given by the viewing user 130 who watches the video distributed by another distribution user 120 is displayed in association with the character 156 positioned at the lowest position in FIG. 10 corresponding to the other distribution user 120.

When a gift display is consecutive with the attack of a character 156 and the combo establishment condition is satisfied, the attack of the character and the gift display are connected, and a combo is generated as shown in FIG. 10. The generation of the combo by the viewing user may be displayed on the message display portion 163 of the game viewing screen 155. At that time, the account name of the viewing user 130 who gave the gift may be displayed.

In the example of FIG. 10, the gift 164 given to "Group A" to which the distribution user 120 belongs is displayed, but when a distribution user 120 is also included in the opponent "Group B," both the gift given to "Group A" and the gift given to "Group B" may be displayed on the game viewing screen 155. Alternatively, only the gift 164 given to "Group A" to which the distribution user 120 who is the distribution source of the video belongs may be displayed on the viewing user device 12B. In this case, the load imposed on processing by the distribution user device 12A can be reduced.

Figure 11:
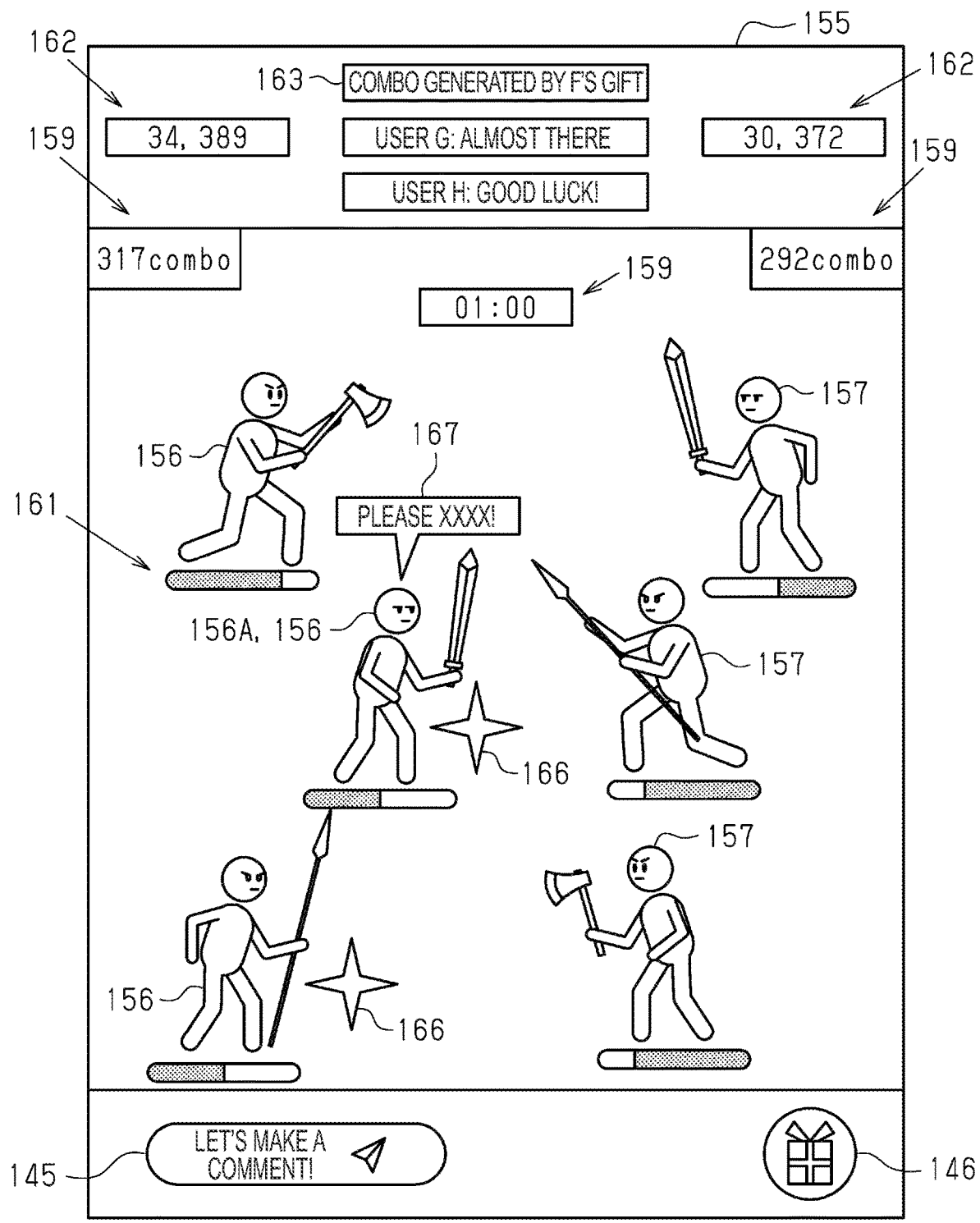
FIG. 11 is a diagram showing the game viewing screen displayed on the viewing user device of the same embodiment.

FIG. 11 is another example of the game viewing screen 155. This game viewing screen 155 displays gifts 166 that are not associated with a particular character 156. For example, by displaying the gifts 166, a parameter of one or more characters 156 may be increased so that the game progresses advantageously. These gifts 166 can also generate a combo by satisfying a combo establishment condition.

Figure 12:
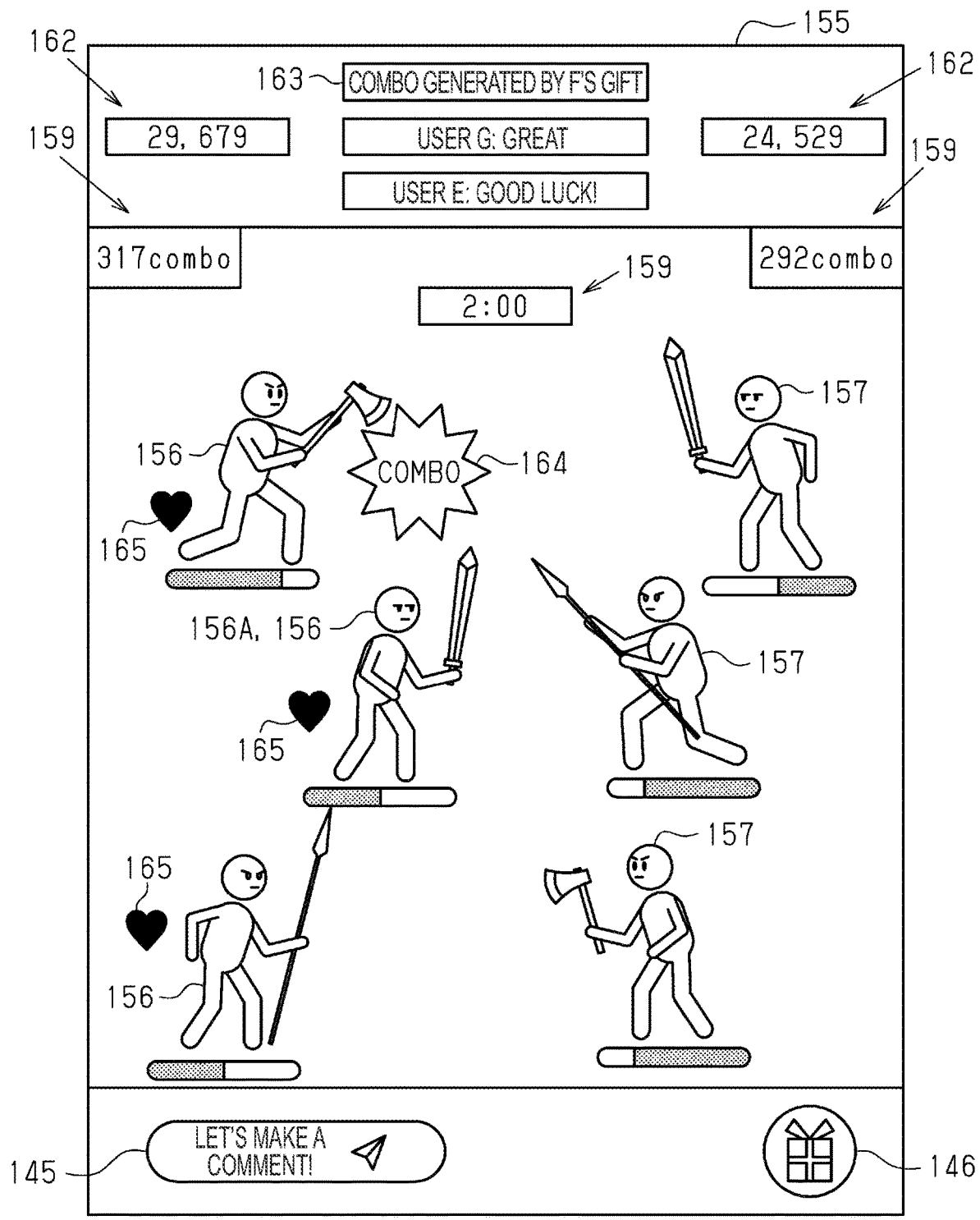
FIG. 12 is a diagram showing the game viewing screen displayed on the viewing user device of the same embodiment.

FIG. 12 is another example of the game viewing screen 155. On this game viewing screen 155, the gift 164 can be displayed in association with not only the character 156A corresponding to the distribution user 120 but also with a character 156 other than the character 156A. The game viewing screen 155 includes a gift display selection portion 165 associated with each of the characters 156. In this example, the gift display selection portions 165 are displayed only on characters 156 of the group to which the distribution user 120 belongs. When a viewing user 130 selects a gift display selection portion 165, a gift 164 is displayed in association with the character 156 corresponding to that gift display selection portion 165. That is, the viewing user 130 can give a gift not only to the distribution user 120 but also to other game users 101 belonging to the same group as the distribution user 120. This gift 164 can also generate a combo by satisfying a combo establishment condition. Therefore, it is possible to fairly support the distribution user 120 and the game users 101. In addition, since benefits of distributing the game video also arise for game users 101 other than the distribution user 120, motivation for video distribution is increased.

Further, the distribution user 120 may allocate the gift given by the viewing user 130 to a game user 101 of the group to which the distribution user 120 belongs. In this case, the distribution user 120 displays a GUI for allocating the gift on the distribution screen. The game server 14 allocates the gift according to the input operation of the distribution user 120.

On the other hand, it is also possible to display the gift display selection portions 165 in association with the characters 157 belonging to the group playing against the group to which the distribution user 120 belongs. In this case, it is possible to add an object that is disadvantageous in the game to the group to which the distribution user 120 belongs. For example, by selecting the gift display selection portion 165, a predetermined parameter such as HP or MP may be reduced by a predetermined amount. The gift display selection portion 165 may be a selection portion that selects a position for displaying a gift in the game virtual space.

Further, when audio 167 spoken by the distribution user 120 is output together with the game viewing screen 155, the distribution user 120 can request a gift through the audio 167. Although gifts reflected in the game have been described in FIGS. 9 to 11, there may be gifts that are only displayed on the game viewing screen 155.

Figure 13:
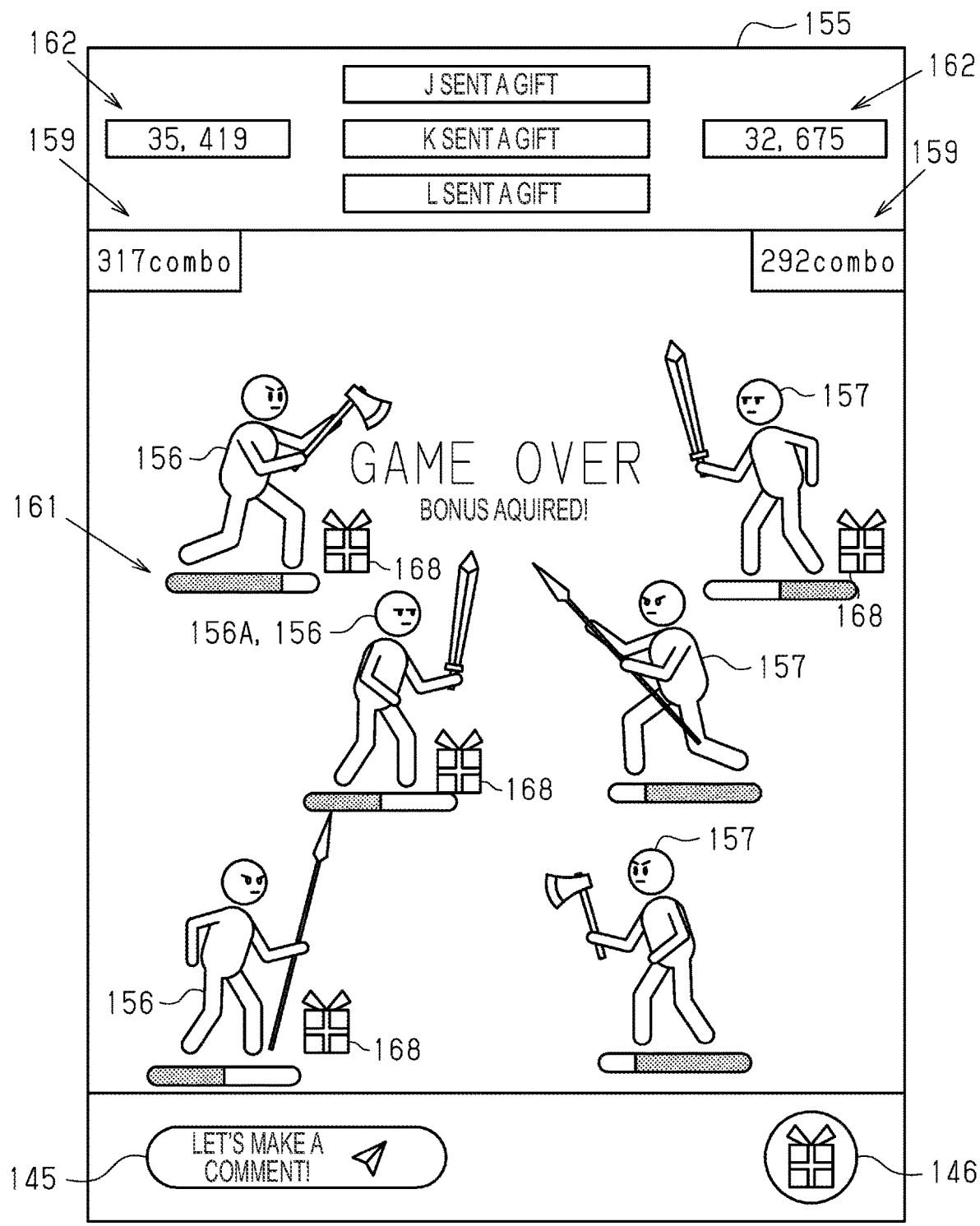
FIG. 13 is a diagram showing the game viewing screen displayed on the viewing user device of the same embodiment.

FIG. 13 shows the game viewing screen 155 at the end of the game. If the game server 14 receives a large amount of gift data D7 or receives gift data D7 immediately before the end of the game, there is a possibility that the gift cannot be displayed during game execution even though the game server 14 has received the gift data D7. In that case, at the end of the game, a bonus 168 that is based on the gift data D7 for the gift which could not be displayed during game execution may be displayed on the game viewing screen 155. The bonus 168 changes a parameter such as points of the gift-receiving group so as to be advantageous in the game. As a result, if there is a draw at the end of the game, one group may win by adding the bonus. Further, since the gift given by the viewing user 130 is ultimately reflected in the game, the satisfaction level of the viewing user 130 can be enhanced.

Figure 14:
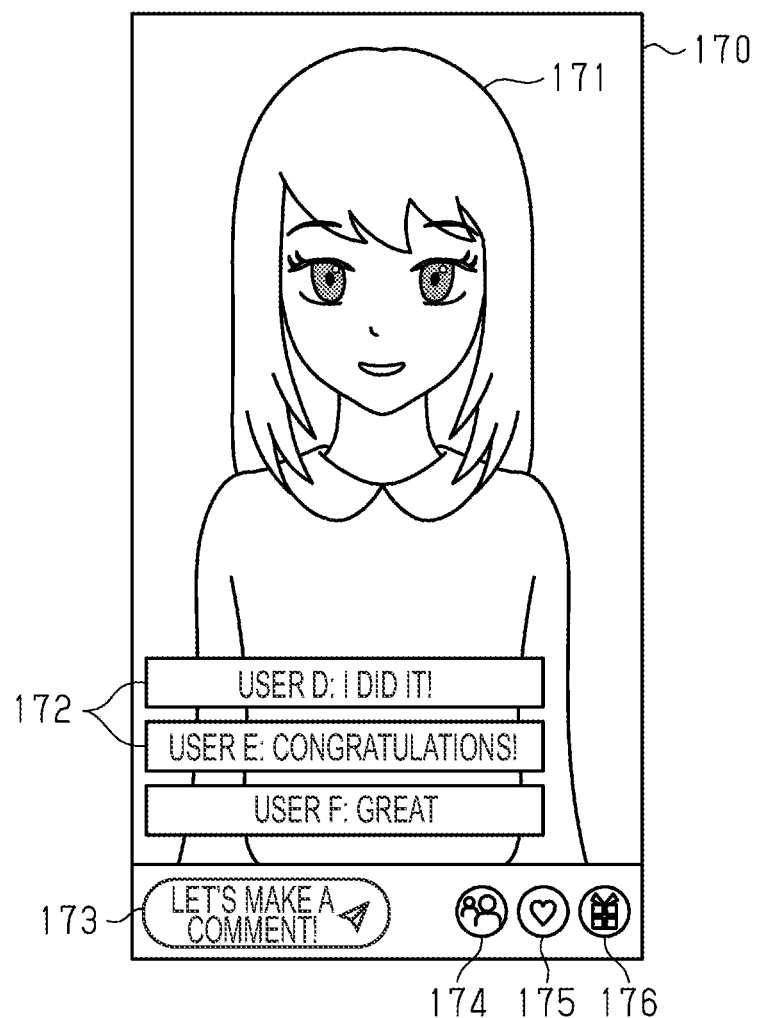
FIG. 14 is a diagram showing a viewing screen displayed on the viewing user device of the same embodiment.

FIG. 14 is an example of a viewing screen 170 in which a video other than a game video is displayed. The viewing screen 170 includes an avatar object 171. The viewing screen 170 is displayed on the viewing user device 12B, for example, when the group battle game ends. Alternatively, the viewing screen 170 may be displayed before the game video is started. The face of the avatar object 171 changes with changes in the facial expression of the distribution user, and the head of the avatar object 171 moves with the movement of the head of the distribution user. Further, the position of the avatar object 171 changes according to changes in the relative distance between the distribution user 120 and the sensor portion 24. The viewing screen 170 includes a message display portion 172. The message display portion 172 displays a message sent from the user device 12 of a viewing user and a message automatically sent by the video distribution server 13. In addition, various operation portions are displayed on the viewing screen 170. For example, the viewing screen 170 may include a comment input field 173, a collaboration setting button 174, an evaluation button 175, and a gift operation button 176. When the collaboration setting button 174 is selected, a screen for permitting or prohibiting collaboration distribution can be displayed. By operating the evaluation button 175, a mark (object) such as a "heart" indicating a favorable evaluation can be displayed on the video. When the gift operation button 176 is operated, a gift object is displayed on the viewing screen 170.

Next, effects of the first embodiment will be described.

(1) When (i) a specified command included in the game operation data D1 sent from the game user device 16 and (ii) the gift data D7 that is based on the gift output request D5 received from the viewing user device 12B establish a combo, the distribution user device 12A and the viewing user device 12B cause an image in accordance with the combo to be displayed on the display 28 based on the combo generation instruction sent from the game server 14. In this way, a viewing user 130 not only views the game video in real time and shares the realism of the game with the distribution user 120 and the like, but the viewing user 130 can also connect the combo within the game. Therefore, the viewing user 130 can not only be involved in the game and support the distribution user 120 and the like, but can also advance the game in cooperation with the distribution user 120. Therefore, the viewing user 130 can obtain a sense of unity with the distribution user 120 and the like. Accordingly, it is possible to distribute a game video that the viewing user 130 can enjoy more.

(2) The distribution user device 12A sends the video data D3 to the video distribution server 13. Therefore, the viewing user device 12B does not need to store the data for configuring the game screen. Further, since the viewing user device 12B does not execute the process for configuring the game screen, the processing load on the viewing user device 12B can be reduced.

(3) The viewing user device 12B can accept an input operation of the viewing user 130, specify one or a plurality of game users 101 from a predetermined number of game users 101, designate the specified game user(s) as a gift recipient(s), and send the gift output request D5. Therefore, the viewing user 130 can give a gift to the game user(s) they favor or the character(s) corresponding to the game user(s). Alternatively, the viewing user 130 can also consider strategy and participate in the game.

Second Embodiment

Next, a second embodiment of the video distribution system will be described. In the second embodiment, the procedure for displaying the video on the viewing user devices is different from that of the first embodiment. Hereinafter, the same parts as those in the first embodiment are designated by the same reference numerals, and detailed description thereof will be omitted.

Figure 15:
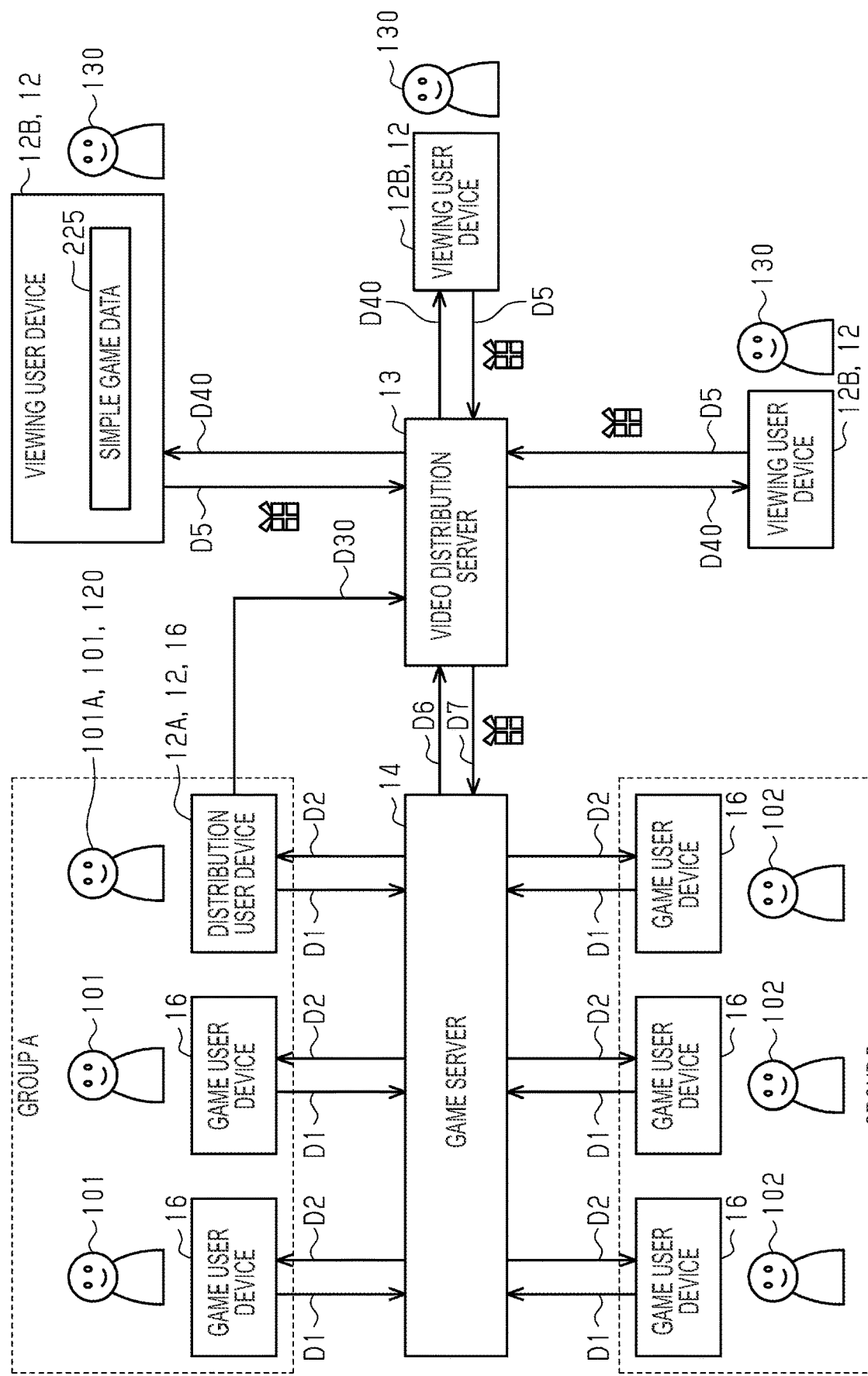
FIG. 15 is a diagram schematically showing a network and types of data sent and received in a second embodiment.

FIG. 15 is a diagram showing the types of data sent and received among game user devices 16, the distribution user device 12A and the viewing user devices 12B. This embodiment differs from the first embodiment in that the viewing user devices 12B use a client rendering method for constructing a video.

The viewing user devices 12B store data for configuring the game screen in the storage 22. As an example, a viewing user device 12B stores simple game data 225 in the storage 22 as a part of the video program 220. The simple game data 225 is data for displaying a game video and includes a program for displaying a screen of a game virtual space and data having a smaller amount of data than the game program 224. For example, the simple game data 225 includes data including textures, game objects, components attached to the game objects and the like, and a program for constructing an image of the game virtual space using these data. Further, the simple game data 225 may include sound data for outputting BGM and production-use audio during execution of the game. Further, in the simple game data 225, data and programs related to a part of the user interface such as an operation button for accepting a user's input operation may be omitted. Further, data stored as three-dimensional data in the video program 220 may be converted into two-dimensional data in the simple game data 225.

The distribution user device 12A sends game operation data D1 including commands that are based on the input operation of the distribution user 120 and game progress data D2 including commands of other game users 101 and 102 input via the game server 14 to the video distribution server 13 as game configuration data D30. The game configuration data D30 may include audio data that is based on speech of the distribution user 120.

The video distribution server 13 sends game configuration data D40 to the viewing user devices 12B displaying the video distributed by the distribution user 120. The game configuration data D30 sent by the distribution user device 12A to the video distribution server 13 and the game configuration data D40 sent by the video distribution server 13 to the viewing user devices 12B may have the same contents or may be different. The viewing user devices 12B construct a game video using the simple game data 225 based on the game configuration data D40 received.

According to the second embodiment, the following effect can be obtained in addition to the effects described in (1) and (2) of the first embodiment.

(4) The distribution user device 12A sends the game configuration data D30 to the video distribution server 13. Therefore, since the viewing user device 12B configures the game screen, the amount of data sent and received between (i) the distribution user device 12A and (ii) the viewing user devices 12B and the video distribution server 13 can be reduced.

Each of the above embodiments can be modified and implemented as follows. The above embodiments and the following variations can be implemented in combination with each other within a technically consistent range.

In each of the above embodiments, a method in which the distribution user device 12A sends the video data D3 to the video distribution server 13 and a method in which the distribution user device 12A sends the game configuration data D40 to the video distribution server 13 have been described. Instead of this, the game server 14 may have a function of distributing video. That is, in this aspect, there is no distribution user device 12A.

Figure 16:
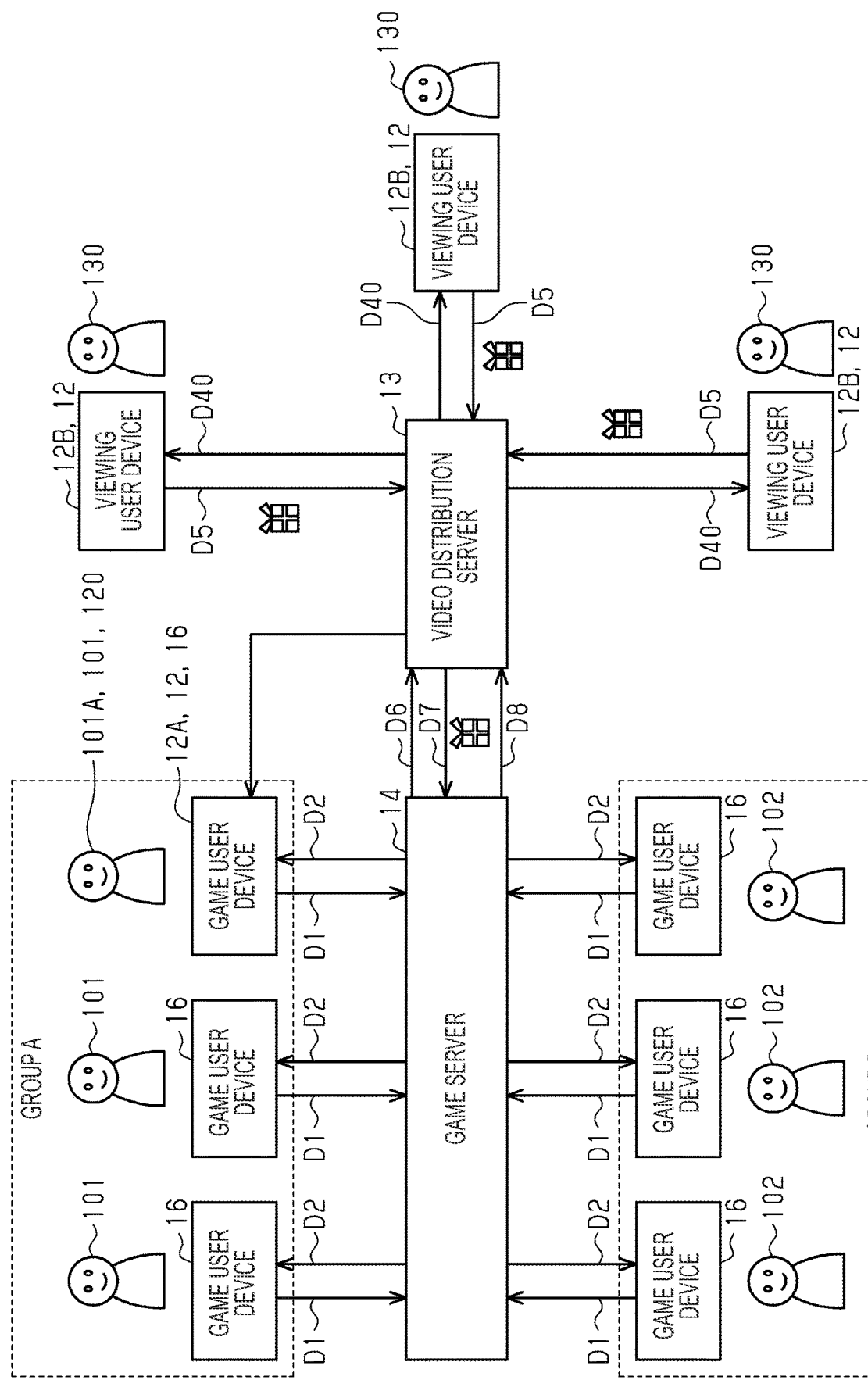
FIG. 16 is a diagram schematically showing the network and the types of data sent and received in the same embodiment in a modified example.

FIG. 16 is a diagram showing data sending/reception among the game user devices 16, the distribution user device 12A, and the viewing user devices 12B. Similar to the second embodiment, the viewing user devices 12B store the simple game data 225 in the storage 22.

The game server 14 generates game configuration data D8 based on the game operation data D1 received from the game user devices 16, and sends the game configuration data D8 to the video distribution server 13. The video distribution server 13 sends game configuration data D40 that is based on the received game configuration data D8 to the viewing user devices 12B. The game configuration data D40 may have the same contents as the game configuration data D8 or may be different.

The viewing user devices 12B construct a screen of the game virtual space using the simple game data 225 based on the received game configuration data D40. According to this aspect, since it is not necessary for the game user devices 16 to execute the process of executing the game and the process of distributing video in parallel, the processing load on the game user devices 16 can be reduced.

Figure 17:
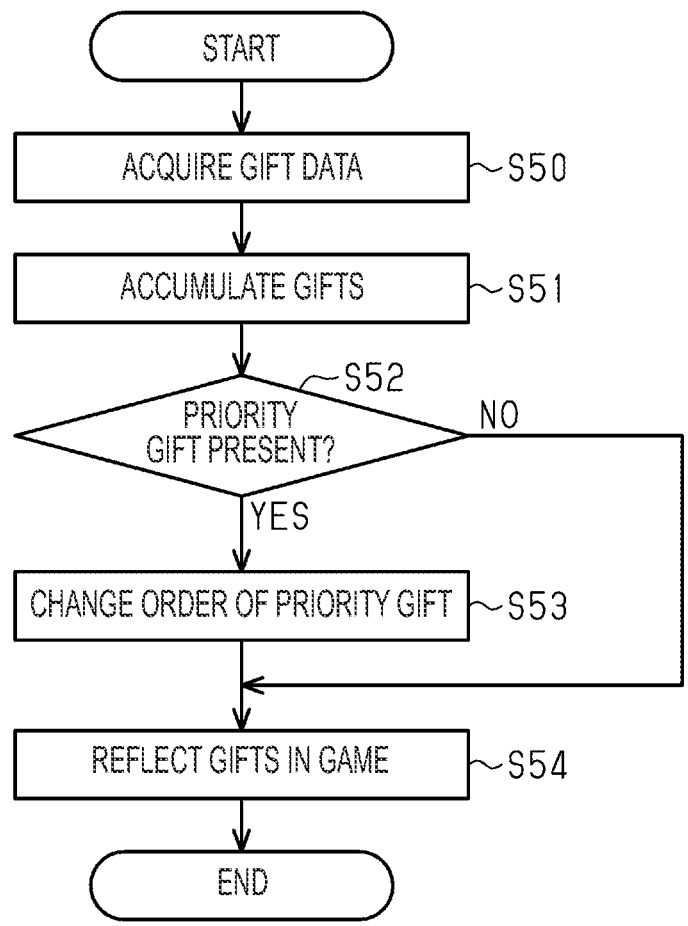
FIG. 17 is a flowchart showing a procedure of a gift output processing of a game server in the modified example.

In each of the above embodiments, the game server 14 accumulates gift data and reflects the gifts based on the gift output requests D5 in the game in the order in which the gift output requests D5 are received, or simultaneously. Alternatively or additionally, the game server 14 may preferentially reflect specified gift data in the game from the accumulated gift data. The procedure of this aspect will be described. As shown in FIG. 17, the game server 14 acquires the gift data D7 from the video distribution server 13 (Step S50), and temporarily stores and accumulates the gift data D7 in a storage medium (Step S51). The game server 14 determines whether there is a priority gift among the accumulated gift data D7 (Step S52). A priority gift is a gift that is reflected in the game with priority. What kinds of gifts are prioritized changes depending on the content of the game. A priority gift is, for example, one having a high effect of advancing the game in an advantageous manner (in-game effect), one related to an ongoing game event, or the like.

When the game server 14 determines that there is no priority gift (Step S52: NO), the game server 14 reflects the gifts that are based on the gift data D7 in the game in the order in which the gift data D7 is received, or simultaneously (Step S54). On the other hand, when the game server 14 determines that there is a priority gift (Step 52: YES), the order of the priority gift is changed (Step S53), and the gifts are reflected in the game according to the changed order (Step S54). In other words, the order of the priority gift is elevated. For example, when gifts that are based on the accumulated gift data D7 are simultaneously reflected in the game, the priority gift may be reflected in the game with priority, and then the remaining gifts may be collectively reflected in the game. By so doing, when the game server 14 receives and accumulates a large amount of gift data D7 from the viewing users 130, it is possible to suppress delays in the order in which gifts having high priority are reflected in the game.

In the second embodiment, the viewing user devices 12B store the simple game data 225 in the storage 22. Instead, the viewing user devices 12B may store the game program 224 having the same configuration as the distribution user device 12A in the first embodiment.

In each of the above embodiments, the game provided by the game server 14 has been described as a GvG game which is a group battle game. Alternatively or additionally, the game server 14 may provide a so-called PvP game in which users individually compete against each other. Even in this case, the game server 14 also generates a combo when the game operation data D1 sent from the user device 12 of a user who plays the game and the gift data D7 whose source is a viewing user device 12B satisfy the combo establishment condition.

In each of the above embodiments, the video distribution server 13 distributes a video in which an avatar object that moves according to the movement of a user is displayed in a three-dimensional virtual space. The avatar object and the character displayed in the game video may be the same character. In this way, a viewing user 130 who likes the avatar object can feel attached to the character displayed in the game video.

In each of the above embodiments, the video distribution server 13 distributes video in which an avatar object that moves according to the movement of the user is displayed in a three-dimensional virtual space, but distribution of video including the avatar object may be omitted.

In each of the above embodiments, it is assumed that a video program for viewing and distributing video is installed in the user devices 12. Instead of this, an application program for viewing the video and an application program for distributing the video may be separated into different application programs. When distributing, the video is distributed using the distribution application program. When viewing, the video is viewed using the viewing application program. The gift output request is made using the viewing application program.

The sensor portion 24 acquires detection data that detects changes in the facial expressions of the user, head movements of the user, and the relative position of the user with respect to the sensor portion 24, but at least one of these may be used. In addition, the sensor portion 24 may acquire other detection data such as detection data that detects movements other than head movements, in addition to or instead of at least one out of changes in the facial expressions of the user, head movements and the relative position of the user.

The virtual space displayed in the video may be an augmented reality (AR) space. For example, animation such as avatar objects and gifts may be displayed superimposed on a real-world image taken by the camera of a user device 12. Further, animation such as gifts may be superimposed on a real-world image including the user taken by the camera of a user device 12.

In the above embodiments, the user devices 12 are information processing devices such as a smartphone, a mobile phone, a tablet terminal, a personal computer, a console game machine, a wearable computer such as a head-mounted display, or the like. Instead of this, the user devices 12 may be systems provided in a studio for video distribution, and may be systems provided with an information processing device including a control portion 20 or the like, a sensor portion 24 attached to the body of a distribution user, a tracking system that detects the position of the sensor portion 24, an operation portion 27, a speaker 25 and a display 28. In these systems, the operating portion 27 is gripped or worn by the user. The tracking system may include a multi-axis laser emitter that emits pulsed laser light for synchronization. The sensor portion 24 includes a sensor that detects the laser light and detects its own position and orientation while synchronizing with the synchronization pulse. As the sensor portion 24, for example, Vive Tracker (registered trademark) and Vive Base Station provided by HTC Corporation (registered trademark) can be used.

In the above embodiments, the sensor portion 24 is provided on the user device 12 side, but this disclosure is not limited to this aspect. For example, at least a part of the sensor portion 24 may be attached to the body of the distribution user or may be provided in the vicinity of the distribution user. For example, a video distribution system installed in a video distribution studio, and which includes a camera, a microphone, a controller, a distribution server, and the like, may be used instead of the distribution user device 12A. Further, the video distribution system includes a tracking system including mounted sensors mounted on the limbs of the distribution user 120, a position detection portion for identifying the position of the mounted sensors, and the like. The camera captures the face of the distribution user. The distribution server generates animation in which the tracking data acquired from the tracking system and the facial expression data acquired from the camera are applied to the avatar object. Further, animation obtained by rendering the background of the virtual space and the avatar object is distributed to the viewing user device 12B as video data together with audio. Further, for example, the tracking system may be composed of a camera or the like that detects markers attached to the body of the distribution user.

EXPLANATION OF SYMBOLS

11 Video distribution system
12 User devices
13 Video distribution server as distribution management portion
14 Game server as game management portion

The invention claimed is:

1. A non-transitory computer readable medium storing a program that causes a computer to execute a process, the computer being configured to receive an input operation from a distribution user and connect to game management circuitry that manages progress of a game and distribution management circuitry, wherein the process includes:
   sending, to the game management circuitry, game operation data that is based on the input operation of the distribution user relating to a game in which a plurality of users participate, wherein the plurality of users includes the distribution user;
   acquiring, from the game management circuitry, game progress data that is based on the game operation data;
   displaying a screen of the game that is based on the game operation data and the game progress data;
   sending, to the distribution management circuitry, display control data for displaying a video of the game on a viewing user device; and
   receiving, from the game management circuitry, gift data that is based on a gift output request sent from the viewing user device, and displaying on the screen of the game a gift that is based on the gift data,
   wherein an image corresponding to consecutive behaviors of the game is displayed on the screen of the game based on an instruction sent from the game management circuitry, when a specified command included in the game operation data sent from a user device used by any of the users participating in the game and the gift output request sent from the viewing user device cause the consecutive behaviors to be established.

2. The non-transitory computer readable medium according to claim 1, wherein data including at least one of (i) image data of an execution screen of the game and (ii) a command that is based on an operation by the plurality of users participating in the game is sent in the display control data.

3. The non-transitory computer readable medium according to claim 1, wherein, when the consecutive behaviors are established, an in-game effect produced by the consecutive behaviors is greater than an in-game effect produced when the consecutive behaviors are not established.

4. The non-transitory computer readable medium according to claim 1, wherein the consecutive behaviors are established when the specified command and the gift output request satisfy a predetermined order, or when the specified command and the gift output request are consecutively received within a predetermined period.

5. The non-transitory computer readable medium according to claim 1, wherein the gift is displayed as a gift image or an action image on the screen of the game in response to the gift output request.

6. The non-transitory computer readable medium according to claim 1, wherein the gift is a wearable object displayed in association with a character of the distribution user, or a physical behavior object that simulates a physical behavior on the screen of the game.

7. The non-transitory computer readable medium according to claim 1, wherein the game is a group battle game.

8. An information processing method for a computer which is configured to receive an input operation from a distribution user and connect to game management circuitry that manages progress of a game and distribution management circuitry, the method comprising:
   sending, to the game management circuitry, game operation data that is based on the input operation of the distribution user relating to a game in which a plurality of users participate, wherein the plurality of users includes the distribution user;

acquiring, from the game management circuitry, game progress data that is based on the game operation data;

displaying a screen of the game that is based on the game operation data and the game progress data;

sending, to the distribution management circuitry, display control data for displaying a video of the game on a viewing user device; and receiving, from the game management circuitry, gift data that is based on a gift output request sent from the viewing user device, and displaying on the screen of the game a gift that is based on the gift data, wherein an image corresponding to consecutive behaviors of the game is displayed on the screen of the game based on an instruction sent from the game management circuitry, when a specified command included in the game operation data sent from a user device used by any of the users participating in the game and the gift output request sent from the viewing user device cause the consecutive behaviors to be established.

9. The information processing method according to claim 8, wherein, when the consecutive behaviors are established, an in-game effect produced by the consecutive behaviors is greater than an in-game effect produced when the consecutive behaviors are not established.

10. The information processing method according to claim 8, wherein the consecutive behaviors are established when the specified command and the gift output request satisfy a predetermined order, or when the specified command and the gift output request are consecutively received within a predetermined period.

11. The information processing method according to claim 8, wherein the gift is displayed as a gift image or an action image on the screen of the game in response to the gift output request.

12. The information processing method according to claim 8, wherein the gift is a wearable object displayed in association with a character of the distribution user, or a physical behavior object that simulates a physical behavior on the screen of the game.

13. The information processing method according to claim 8, wherein the game is a group battle game.

14. An information processing device configured to receive an input operation from a distribution user and connect to game management circuitry that manages progress of a game and distribution management circuitry, the information processing device comprising:

distribution circuitry programmed to:
send, to the game management circuitry, game operation data that is based on the input operation of the distribution user relating to a game in which a plurality of users participate, wherein the plurality of users includes the distribution user;
acquire, from the game management circuitry, game progress data that is based on the game operation data;
display a screen of the game that is based on the game operation data and the game progress data;
send to the distribution management circuitry display control data for displaying a video of the game on a viewing user device; and
receive, from the game management circuitry, gift data that is based on a gift output request sent from the viewing user device, and display on the screen of the game a gift that is based on the gift data,
wherein the distribution circuitry displays an image corresponding to consecutive behaviors of the game on the screen of the game based on an instruction sent from the game management circuitry, when a specified command included in the game operation data sent from a user device used by any of the users participating in the game and the gift output request sent from the viewing user device cause consecutive behaviors to be established.

15. The information processing device according to claim 14, wherein, when the consecutive behaviors are established, an in-game effect produced by the consecutive behaviors is greater than an in-game effect produced when the consecutive behaviors are not established.

16. The information processing device according to claim 14, wherein the consecutive behaviors are established when the specified command and the gift output request satisfy a predetermined order, or when the specified command and the gift output request are consecutively received within a predetermined period.

17. The information processing device according to claim 14, wherein the gift is displayed as a gift image or an action image on the screen of the game in response to the gift output request.

18. The information processing device according to claim 14, wherein the gift is a wearable object displayed in association with a character of the distribution user, or a physical behavior object that simulates a physical behavior on the screen of the game.

19. The information processing device according to claim 14, wherein the game is a group battle game.

* * * * *